US012728951B2

(12) United States Patent
Van Druten

(10) Patent No.: US 12,728,951 B2
(45) Date of Patent: Sep. 8, 2026

(54) TRANSMISSION SYSTEM FOR A VEHICLE, PREFERABLY A BICYCLE

(71) Applicant: CLASSIFIED CYCLING BV, Antwerp (BE)

(72) Inventor: Roëll Marie Van Druten, Eindhoven (NL)

(73) Assignee: CLASSIFIED CYCLING B.V., Antwerp (BE)

( * ) Notice: Subject to any disclaimer, the term of this patent is extended or adjusted under 35 U.S.C. 154(b) by 0 days.

(21) Appl. No.: 18/564,345

(22) PCT Filed: Apr. 25, 2022

(86) PCT No.: PCT/EP2022/060913
§ 371 (c)(1),
(2) Date: Nov. 27, 2023

(87) PCT Pub. No.: WO2022/248134
PCT Pub. Date: Dec. 1, 2022

(65) Prior Publication Data
US 2024/0239443 A1 Jul. 18, 2024

(30) Foreign Application Priority Data
May 28, 2021 (NL) ...................................... 2028336
Jul. 9, 2021 (NL) ...................................... 2028685
(Continued)

(51) Int. Cl.
*B62M 11/18* (2006.01)
*B62J 43/30* (2020.01)
(Continued)

(52) U.S. Cl.
CPC .............. *B62M 11/18* (2013.01); *B62J 43/30* (2020.02); *B62M 6/50* (2013.01); *B62M 6/55* (2013.01); *B62M 6/90* (2013.01); *B62M 11/16* (2013.01)

(58) Field of Classification Search
CPC ..... B62M 11/18; B62M 11/16; B62M 11/145; B62M 6/50; B62M 6/55; B62M 6/90;
(Continued)

(56) References Cited

U.S. PATENT DOCUMENTS 2,884,812 A 5/1959 Reis
5,540,456 A 7/1996 Meier-Burkamp et al.
(Continued)

FOREIGN PATENT DOCUMENTS

EP 0303531 A2 2/1989
EP 0336033 A1 10/1989
(Continued)

OTHER PUBLICATIONS

International Search Report dated Oct. 17, 2022, issued in corresponding International Application No. PCT/EP2022/060913 (6 pgs.).
(Continued)

*Primary Examiner* — Lori Wu
(74) *Attorney, Agent, or Firm* — Pillsbury Winthrop Shaw Pittman, LLP

(57) ABSTRACT

Disclosed is a transmission system for a vehicle, particularly for a bicycle. The system comprises an input and an output, and a first transmission and a second transmission between the input and the output, wherein the first transmission and the second transmission are connected in series. The first transmission is selectively operable according to a first transmission ratio or a second transmission ratio, and has a first load-shifting clutch for switching the first transmission
(Continued)

from the first transmission ratio to the second transmission ratio and/or vice versa. The second transmission is selectively operable according to a third transmission ratio or a fourth transmission ratio, and has a second load-shifting clutch for switching the second transmission from the third transmission ratio to the fourth transmission ratio and/or vice versa.

29 Claims, 20 Drawing Sheets

(30) Foreign Application Priority Data

| | | |
|---|---|---|
| Jul. 9, 2021 | (NL) | 2028686 |
| Jul. 26, 2021 | (NL) | 2028836 |
| Dec. 23, 2021 | (NL) | 2030258 |
| Dec. 23, 2021 | (NL) | 2030261 |
| Mar. 1, 2022 | (NL) | 2031117 |
| Mar. 1, 2022 | (NL) | 2031121 |
| Mar. 1, 2022 | (NL) | 2031123 |
| Apr. 19, 2022 | (NL) | 2031622 |

(51) Int. Cl.

*B62M 6/50* (2010.01)
*B62M 6/55* (2010.01)
*B62M 6/90* (2010.01)
*B62M 11/16* (2006.01)

(58) Field of Classification Search

CPC .... B62J 43/30; F16H 3/64; F16H 2200/0034; F16H 2200/0043; F16H 2200/2005; F16H 2200/2007; F16H 2200/2035; F16H 37/022

See application file for complete search history.

(56) References Cited

U.S. PATENT DOCUMENTS

| | | | | |
|---|---|---|---|---|
| 6,048,287 | A | 4/2000 | Rohloff | |
| 2003/0096674 | A1 | 5/2003 | Uno | |
| 2011/0130242 | A1 | 6/2011 | Gobel | |
| 2011/0241306 | A1 | 10/2011 | Serkh et al. | |
| 2014/0090500 | A1 | 4/2014 | Schmitz et al. | |
| 2014/0290412 | A1 | 10/2014 | Emura et al. | |
| 2015/0307157 | A1 | 10/2015 | Gao | |
| 2016/0040763 | A1* | 2/2016 | Nichols | F16H 15/52 475/189 |
| 2017/0217538 | A1 | 8/2017 | Yamamoto | |
| 2017/0248212 | A1 | 8/2017 | Heinz et al. | |
| 2017/0248214 | A1* | 8/2017 | McIndoe | F16H 37/086 |
| 2018/0252303 | A1 | 9/2018 | Martin et al. | |
| 2018/0372199 | A1* | 12/2018 | Kieke | F16H 37/086 |
| 2021/0354783 | A1 | 11/2021 | Van Druten et al. | |

FOREIGN PATENT DOCUMENTS

| | | | |
|---|---|---|---|
| EP | 2028096 | A1 | 2/2009 |
| GB | 191202751 | | 11/1912 |
| GB | 2312259 | A | 10/1997 |
| NL | 2020020 | B1 | 12/2017 |
| NL | 2028336 | B1 | 5/2021 |
| WO | 2011/004988 | A2 | 1/2011 |
| WO | 2014/172422 | A1 | 10/2014 |
| WO | 2018/199757 | A2 | 11/2018 |
| WO | 2020/085911 | A2 | 4/2020 |
| WO | 2021/080431 | A1 | 4/2021 |
| WO | 2022/248136 | A2 | 12/2022 |

OTHER PUBLICATIONS

Written Opinion of the International Searching Authority dated Oct. 17, 2022, issued in corresponding International Application No. PCT/EP2022/060913 (15 pgs.).

International Search Report dated Oct. 17, 2022, issued in International Application No. PCT/EP2022/060915 (6 pgs.).

International Search Report dated Nov. 28, 2022, issued in International Application No. PCT/EP2022/060920 (5 pgs.).

Written Opinion of the International Searching Authority dated Nov. 28, 2022, issued in International Application No. PCT/EP2022/060920 (13 pgs.).

Written Opinion of the International Searching Authority dated Oct. 17, 2022, issued in International Application No. PCT/EP2022/060915 (15 pgs.).

* cited by examiner 490
491
100
200
V1
R1
100A
200A
R3
V2
I
404
405
CVT
O
403
101
R2
VB1
C1
102
201
VB2
C2
R4
202
100B
200B
Actuator 3
501
Actuator 1
450
Electric motor
Actuator 2
503
502
Power supply
Control unit
507
500
Sensors
User interface
506
505

TRANSMISSION SYSTEM FOR A VEHICLE, PREFERABLY A BICYCLE

CROSS-REFERENCE TO RELATED APPLICATIONS

This application is the national stage entry of PCT/EP2022/060913, filed Apr. 25, 2022, which claims priority to Netherlands Application No. 2028336, filed May 28, 2021, Netherlands Application No. 2028685, filed Jul. 9, 2021, Netherlands Application No. 2028686, filed Jul. 9, 2021, Netherlands Application No. 2028836, filed Jul. 26, 2021, Netherlands Application No. 2030258, filed Dec. 23, 2021, Netherlands Application No. 2030261, filed Dec. 23, 2021, Netherlands Application No. 2031121, filed Mar. 1, 2022, Netherlands Application No. 2031123, filed Mar. 1, 2022, Netherlands Application No. 2031117, filed Mar. 1, 2022, and Netherlands Application No. 2031622, filed Apr. 19, 2022, the entire contents of each of which are herein incorporated by reference in their entireties.

FIELD

The invention relates to a transmission system for a vehicle, particularly a human powered vehicle, such as a bicycle, e.g. a two-wheeled bicycle.

BACKGROUND TO THE INVENTION

Transmission systems for bicycles are known. In bicycles, especially racing bicycles, the transmission system traditionally includes a front derailleur and a rear derailleur for shifting gears of the transmission system. An alternative to derailleurs is formed by gear hubs, where shifting of gears is accommodated by a gear shifting mechanism inside the, generally rear, wheel hub. A hybrid form is known where a gear hub torque transmission having at least two selectable gear ratios is coupled between the rear wheel hub and the rear sprocket. Herein the rear sprocket can include a plurality of gear wheels, selectable through a rear derailleur. Here the gear hub can take the place of a front derailleur.

Such gear hub gear shifting mechanisms can include one or more planetary gear sets. The planetary gear includes at least three rotational members, such as a sun gear, a planet carrier and a ring gear. A clutch system can be used for selectively coupling two of the rotational members, e.g. the planet carrier and the ring gear. When coupled, the hub gear shifting mechanism operates according to a first gear ratio. When decoupled, the hub gear shifting mechanism operates according to a second gear ratio.

Also gear hub shifting mechanisms are known wherein mechanisms are included in the gear hub for providing a plurality of different transmission ratios, such as five, seven or fourteen different gear ratios.

Many of these systems have in common that up- and downshifting is not always possible, depending on the riders pedal force. In some systems, it is required that the rider stops pedaling, or at least stops providing torque load to the system to allow up-shifting and/or down-shifting.

SUMMARY

It is an object to provide a transmission system, such as for a, e.g. two wheeled, bicycle. It is additionally or alternatively an object to provide an efficient transmission system, having minimal weight and minimal friction losses. Alternatively, or additionally, it is an object to enable, preferably electronically actuated, shifting of gears, wherein up- and downshifting should always be possible, not depending on the riders pedal force and/or electromotor torque.

According to an aspect is provided a transmission system for a vehicle, particularly a human powered vehicle such as bicycle, comprising a system input and a system output, wherein the system input is arranged to be connected to a power source, such as a crank and/or an electric motor and/or a user input, and the system output is arranged to be connected to a load, such as a driven wheel. The transmission system comprises a continuously variable transmission (CVT) and a first transmission between the system input and the system output, wherein the CVT and the first transmission are connected in series. The CVT is selectively operable according to a plurality of different transmission ratios within a continuous range of transmission ratios, and has an actuation element for switching the continuous variable transmission from one transmission ratio in said continuous range to another. The first transmission is selectively operable according to a first transmission ratio or a second transmission ratio. The first transmission can have a first clutch for switching the first transmission from the first transmission ratio to the second transmission ratio and/or vice versa. Optionally, the transmission system further includes a second transmission selectively operable according to a third transmission ratio or a fourth transmission ratio, and having a second clutch for switching the second transmission from the third transmission ratio to the fourth transmission ratio and/or vice versa.

The transmission system can be a crank transmission, included in a crank housing.

The transmission system can provide for a plurality of different system transmission ratios between the system input and the system output. The term "system transmission ratio" herein is used to indicate the effective transmission ratio between the system input and the system output of the transmission system. The CVT particularly provides for a plurality of different continuously variable system transmission ratios between the system input and the system output.

The first transmission may have a first input and a first output, wherein the first input can be connected to the system input or wherein the first output may be connected to the system output. The CVT may have CVT input and a CVT output wherein the CVT input may be connected to the system input or wherein the CVT output may be connected to the system output. A particular arrangement provides that the first input is connected to the system input, that the CVT output is connected to the system output, and that the CVT input is connected to the first output. Alternatively. the CVT input is connected to the system input, that the first output is connected to the system output, and that first input is connected to the CVT output.

Optionally, the first clutch is a form-closed clutch arranged to transfer torque in at least one rotational direction.

Optionally, the first clutch is a load-shifting clutch arranged for being coupled and/or decoupled under load. It may be preferred to couple and/or decouple the first clutch of the transmission system under load, to switch between transmission ratios while transmitting torque through the transmission system.

Optionally, the first transmission is arranged to operate according to the first transmission ratio when the first clutch is in a first state, and to operate according to the second transmission ratio when the first clutch is in a second state. The first clutch for instance has a coupled state in which a first clutch input and a first clutch output of the first clutch are coupled for transferring torque from the first clutch input to the first clutch output. The first clutch may also have a decoupled state in which the first clutch input and the first clutch output are decoupled. The first state of the first clutch may correspond to the coupled state, and the second state of the first clutch may correspond to the decoupled state, or vice versa.

Optionally, the first transmission includes a first transmission path and a second transmission path parallel to the first transmission path, wherein at least one of the first and second transmission paths includes the first clutch. Hence, torque can be selectively transmitted through either the first or the second transmission path, using the first clutch. For example, in a coupled state of the first clutch, torque can be transmitted through the transmission path which include the first clutch, e.g. the first transmission path. In an uncoupled state of the first clutch, no torque can be transmitted through the transmission path which includes the first clutch. Instead, torque can for instance be transmitted through the other, parallel, transmission path, e.g. the second transmission path.

The first transmission path may for example include a first gearing for providing the first transmission ratio; the second transmission path a second gearing for providing the second transmission ratio. Each of said gearings may for example include meshing gears, e.g. a meshing primary and secondary gear pair, and/or belt-driven wheels, e.g. a primary and secondary gear pair drivingly coupled via an endless drive member such as a belt or chain.

Optionally, the first clutch is arranged in the second transmission path, wherein the first transmission path includes a first freewheel clutch. The first freewheel clutch is optionally serially connected between the first transmission input and the first gearing. The first freewheel clutch may alternatively be serially connected between the first gearing and the first transmission output.

Optionally, the second transmission path includes a second freewheel clutch.

Optionally, an output of the second freewheel is connected to an input of the first clutch. Hence, freewheeling between the transmission input and transmission output can be allowed also when the first clutch is in the coupled state.

Optionally, the second freewheel clutch is serially connected between the second gearing and the first clutch.

Optionally, the first clutch is serially connected between the second freewheel clutch and the second gearing.

Optionally, the second gearing is serially connected between the first clutch and the second freewheel clutch.

Optionally, the first transmission includes a planetary gear set.

Optionally the planetary gear set comprises a sun gear, a planet carrier carrying one or more planet gears, and a ring gear, wherein the planet carrier is coupled or couplable to an output of the CVT.

Optionally the sun gear is coupled or couplable to an output of the transmission system.

Optionally the one or more planet gears are each embodied as a stepped planet gear, having a large-radius planet gear member and a small-radius planet gear member corotatably connected to each other.

Optionally a planet gear rotation axis of the one or more planet gears extends parallel to a sun gear rotation axis of the sun gear, or a planet gear rotation axis of the one or more planet gears extends non-parallel, e.g. transverse, to a sun gear rotation axis of the sun gear.

Optionally the planetary gear set is arranged in the second transmission path for providing the second transmission ratio.

Optionally the first clutch is arranged in the second transmission path and the first transmission path includes a first freewheel clutch.

Optionally the second transmission path includes a second freewheel clutch.

Optionally, at least one of the second transmission ratio is a 1:1 transmission ratio. Optionally, the smallest transmission ratio of the CVT and the first transmission is a 1:1 transmission ratio. Optionally, the smallest system transmission ratio of the transmission system is a 1:1 transmission ratio. For street or racing bicycles a 1:1 system transmission ratio as smallest system transmission ratio can be desirable. For mountain bikes or all terrain bikes a smallest system transmission ratio of smaller than 1:1 may be desirable.

Optionally, the CVT comprises a first drive element that is rotatable about a first CVT axis, a second drive element that is rotatable about a second axis parallel to the first axis, wherein the second drive element is movable relative to the first drive element in a direction transverse to the first axis; and first coupling elements for transferring torque between the first drive element and the second drive element, wherein the first coupling elements are provided at a constant first radius from the first axis and at a variable second radius from the second axis. Such CVT is e.g. described in co-pending application NL2028686 incorporated herein by reference in its entirety.

Optionally, the CVT comprises a third drive element that is rotatable about a third axis parallel to the second axis wherein the third drive element and the second drive element are movable relative to each other in a direction transverse to the third axis; and second coupling elements provided at a constant third radius from the third axis and at a variable fourth radius from the second axis, for transferring torque between the third drive element and the second drive element.

Optionally, the third drive element is directly couplable to the system output, for example by means of a one-way clutch.

Optionally, the system comprises a second transmission between the system input and the system output, wherein the continuously variable transmission, the first transmission and the second transmission are connected in series, the second transmission being selectively operable according to a third transmission ratio or a fourth transmission ratio, and e.g. having a second clutch for switching the second transmission from the third transmission ratio to the fourth transmission ratio and/or vice versa.

Optionally, the second transmission is arranged to operate according to the third transmission ratio when the second clutch is in a first state, and to operate according to the fourth transmission ratio when the second clutch is in a second state. The second clutch for instance has a coupled state in which a second clutch input and a second clutch output of the second clutch are coupled for transferring torque from the second clutch input to the second clutch output. The second clutch may also have a decoupled state in which the second clutch input and the second clutch output are decoupled. The first state of the second clutch may correspond to the coupled state, and the second state of the second clutch may correspond to the decoupled state, or vice versa.

The first clutch and the second clutch are optionally, at least substantially, identical.

Optionally, the second transmission includes a third transmission path and a fourth transmission path parallel to the third transmission path, at least one of the third and fourth transmission paths including the second clutch. For example, in a coupled state of the second clutch, torque can be transmitted through the transmission path which include the second clutch, e.g. the third transmission path. In an uncoupled state of the second clutch, no torque can be transmitted through the transmission path which includes the second clutch. Instead, torque can for instance be transmitted through the other, parallel, transmission path, e.g. the fourth transmission path. Optionally, the second clutch is arranged in the fourth transmission path, wherein the third transmission path includes a third freewheel clutch. The third freewheel clutch is optionally serially connected between the second transmission input and the third gearing. The third freewheel clutch may alternatively be serially connected between the third gearing and the second transmission output.

Optionally, the fourth transmission path includes a fourth freewheel clutch.

Optionally, an output of the fourth freewheel is connected to an input of the second clutch.

Hence, the second freewheel clutch may be serially connected to the first clutch at an input side of the first clutch and/or the fourth freewheel clutch may be serially connected to the second clutch at an input side of the second clutch.

Optionally, the fourth freewheel clutch is serially connected between the fourth gearing and the second clutch.

Optionally, the second clutch is serially connected between the fourth freewheel clutch and the fourth gearing.

Optionally, the fourth gearing is serially connected between the second clutch and the fourth freewheel clutch.

Optionally, in a particular compact setup, the second freewheel clutch is serially connected between the second gearing and the first clutch, and the fourth gearing is serially connected between the second clutch and the fourth freewheel clutch. Hence, an output of the first transmission may be formed by an output of the first clutch, and an input of the second transmission may be formed by an input the second clutch. The first clutch output and the second clutch input may for example be coupled to each other or integrated.

Optionally, the second transmission includes a third transmission path for providing the third transmission ratio and a fourth transmission path, parallel to the third transmission path, for providing the fourth transmission ratio, at least one of the third and fourth transmission paths including the second clutch.

Optionally, the third transmission ratio equals the lowest desired system transmission ratio by the first transmission ratio. For example, a product of the first transmission ratio and the third transmission ratio provides the lowest system transmission ratio.

Optionally, when a ratio of the second transmission ratio and the first transmission ratio is equal to U, a ratio of the fourth transmission ratio and the third transmission ratio is, e.g. within 5%, equal to $U^2$. In other words, the ratio of the fourth transmission ratio and the third transmission ratio is, e.g. within 5%, equal to the square of the ratio of the second transmission ratio and the first transmission ratio. For example, when the second transmission ratio divided by the first transmission ratio is equal to U, a the fourth transmission ratio divided by the third transmission ratio is, e.g. within 5%, equal to $U^2$.

Optionally, when a ratio of the second transmission ratio and the first transmission ratio is, e.g. within 5%, equal to U, a product of the first transmission ratio and the fourth transmission ratio is, e.g. within 5%, equal to $U^2$. In other words, the product of the first transmission ratio and the fourth transmission ratio is equal to the ratio of the second transmission ratio and the first transmission ratio. For example, when the second transmission ratio divided by the first transmission ratio is, e.g. within 5%, equal to U, the first transmission ratio times the fourth transmission ratio is, e.g. within 5%, equal to $U^2$.

Optionally, a ratio of the second transmission ratio and the first transmission ratio equals, e.g. within 5%, to a product of the second transmission ratio and the third transmission ratio.

Optionally, a ratio of the second transmission ratio and the first transmission ratio is between 1.1 and 1.3, preferably about 1.2. The ratio of the second transmission ratio and the first transmission ratio is for example 1.20 or 1.24. The ratio of the fourth transmission ratio and the third transmission ratio is for example 1.44 or 1.54. For example, the first transmission ratio is 1, the second transmission ratio is 1.2, the third transmission ratio is 1, and the fourth transmission ratio is 1.44.

Optionally, the second or fourth transmission ratio is a speed up transmission ratio. It will be appreciated that a transmission ratio of a transmission is defined as an output speed of an output of the transmission divided by an input speed of an input of the transmission. A speed up transmission ratio thus corresponds to a transmission in which the output speed of the transmission is higher than an input speed of the transmission. The speed-up transmission ratio is thus larger than one. Optionally, the first, second, third or fourth transmission ratio is a reduction transmission ratio. A reduction transmission ratio thus corresponds to a transmission in which the output speed of the transmission is lower than an input speed of the transmission. A reduction transmission ratio is smaller than one.

Optionally, the second transmission ratio is larger than the first transmission ratio. The first clutch may particularly be in the transmission path of the first transmission having the largest transmission ratio.

Optionally, at least one of the first transmission ratio and the second transmission ratio is a speed-down transmission ratio, and at least one of the third transmission ratio and the fourth transmission ratio is a speed-up transmission ratio. Alternatively, at least one of the first transmission ratio and the second transmission ratio is a speed-up transmission ratio, and at least one of the third transmission ratio and the fourth transmission ratio is a speed-down transmission ratio.

Optionally, the system of any preceding claim, wherein the second transmission ratio is smaller than the first transmission ratio.

Optionally, when the first transmission ratio or the second transmission ratio is, e.g. within 5%, equal to U, the third transmission ratio or the fourth transmission ratio is, e.g. within 5%, equal to $U^{-2}$. In other words, the third transmission ratio or the fourth transmission ratio is, e.g. within 5%, equal to the squared inverse of the first transmission ratio or the squared inverse of the second transmission ratio.

Optionally, when the first transmission ratio or the second transmission ratio is, e.g. within 5%, equal to U, the third transmission ratio or the fourth transmission ratio is, e.g. within 5%, equal to $U^{-1/2}$. In other words, the third transmission ratio or the fourth transmission ratio is, e.g. within 5%, equal to the square root of the inverse of the first transmission ratio or the square root of the inversed second transmission ratio.

Optionally, the transmission system comprises further transmissions, such as a third transmission, connected in series with the first and second transmissions between the input and the output, the third transmission having a third clutch, and the third transmission being operable according to a fifth transmission ratio and a sixth transmission ratio. The third clutch is optionally a form-closed clutch arranged to transfer torque in at least one rotational direction. The third clutch may be arranged for being coupled and/or decoupled under load. It will be appreciated that the third transmission may be similar to the first transmission and/or the second transmission as described herein. Hence, any features described herein in view of the first and/or second transmission apply equally to the third transmission.

Optionally, the third transmission is arranged to operate according to the fifth transmission ratio when the third clutch is in a first state, and to operate according to the sixth transmission ratio when the third clutch is in a second state. The third clutch for instance has a coupled state in which a third clutch input and a third clutch output of the third clutch are coupled for transferring torque from the third clutch input to the third clutch output. The third clutch may also have a decoupled state in which the third clutch input and the third clutch output are decoupled. The first state of the third clutch may correspond to the coupled state, and the second state of the third clutch may correspond to the decoupled state, or vice versa.

Optionally, when a ratio of the second transmission ratio and the first transmission ratio is equal to U, a ratio of the fourth transmission ratio and the third transmission ratio is e.g., e.g. within 5%, equal to $U^2$, and a ratio of the sixth transmission ratio and the fifth transmission ratio is, e.g. within 5%, equal to $U^4$.

Optionally, the transmission system comprises a bypass transmission path between the input and the output parallel to the first and/or the second transmission, said bypass transmission path including a bypass transmission clutch, such as a freewheel clutch. Hence, the bypass transmission path can provide an additional transmission ratio between the system input and the system output.

Optionally, the transmission system comprises a bypass transmission path between the input and the output parallel to the first and/or the second and/or the third transmission, said bypass transmission path including a bypass clutch, such as a freewheel clutch.

Optionally, a bypass clutch actuator is provided for selectively actuating the bypass clutch between a coupled state in which the bypass clutch couples a bypass clutch input with a bypass clutch output for transferring torque and a decoupled state in which the bypass clutch input and bypass clutch are decoupled.

Optionally, the transmission system comprises an intermediate shaft, wherein the first transmission is operable between the input and the intermediate shaft, and the second transmission is operable between the intermediate shaft and the output. The first output of the first transmission and the second input of the second transmission may be connected or connectable to the intermediate shaft.

Optionally, the transmission system comprises an input shaft associated with the input, and an output shaft associated with the output, wherein the input shaft is connectable to the output shaft via the intermediate shaft.

Optionally, the output shaft extends coaxially to the input shaft. Hence, the input and output shafts can be substantially aligned.

Optionally, the output shaft is offset from the input shaft.

Optionally, each of the clutches, e.g. the first, second and third clutch, are a form-closed clutches arranged to transfer torque in at least one rotational direction.

Optionally, each of the clutches is a load-shifting clutch arranged for being coupled and/or decoupled under load.

Optionally, each load-shifting clutch has a clutch input, and a clutch output, each clutch including:

- a first unit connectable to the clutch input or clutch output, including at least one first abutment surface;
- a second unit connectable to the clutch output or clutch input, respectively, including at least one second abutment surface arranged for selectively engaging the first abutment surface, the first and second abutment surfaces being adapted to each other so as to allow disengaging under load, preferably in two directions;
- a third unit including at least one retaining member, the third unit being arranged for selectively being in a first mode or a second mode relative to the second unit, wherein the at least one retaining member in the first mode locks the at least one second abutment surface for rotationally coupling the second unit to the first unit, e.g. in two directions, and in the second mode releases the at least one second abutment surface for decoupling the second unit from the first unit. The transmission system including such load-shifting clutch (or clutches) can be manufactured in a small form-factor suitable for integration in a two-wheeled bicycle.

Optionally, each clutch includes an actuator for moving the third unit from a first position to a second position or from a second position to a first position relative to the second rotatable unit.

Optionally, the third unit includes at least one actuation member arranged for moving the third unit from a first position to a second position or from a second position to a first position relative to the second rotatable unit.

Optionally, the clutch includes a first rotatable unit connectable to the input; a second rotatable unit connectable to the output; a third rotatable unit arranged for co-rotating with the second rotatable unit, the third rotatable unit being arranged for selectively being in a first rotational position or a second rotational position relative to the second rotatable unit, wherein the system is arranged for selectively in the first rotational position rotationally coupling the second rotatable unit to the first rotatable unit, and in the second rotational position decoupling the second rotatable unit from the first rotatable unit; wherein the system is arranged for temporarily changing rotation speed of the third rotatable unit relative to the second rotatable unit for rotating from the first position to the second position, or from the second position to the first position.

Optionally, each clutch further comprises a fourth unit including a selector, the selector being arranged for selectively being in a gripping or non-gripping mode; the selector in the gripping mode being arranged for gripping the at least one actuation member for rotating the third rotatable unit from the first position to the second position or from the second position to the first position relative to the second rotatable unit; the selector in the non-gripping mode being arranged for not engaging the at least one actuation member.

Optionally, the first unit of the first load-shifting clutch, and the first unit of the second load-shifting clutch are coupled or integrated together.

Optionally, the second unit of the second load-shifting clutch is bearing supported by the first unit of the first load-shifting clutch.

The clutches described herein may for example be load-shifting clutches as described in WO2018/199757A2, WO2020/085911A2, or WO2021/080431A1 which are hereby incorporated by reference in their entirety.

Optionally, the transmission system comprises a control unit configured for controlling one or more actuators of the bicycle in general, and of the transmission system in particular. The control unit may be configured to receive sensor signals from one or more sensors of the bicycle in general, and of the transmission system in particular. The control unit may for example control the one or more actuators based on the received sensor signals. The sensor signals may for example include a shift signal from a user-operable shifter, wherein the control unit controls the transmission system so as to shift gears of the transmission based on the received shift signal.

Optionally, the control unit is configured to receive a first shift signal and a second shift signal, and configured to control the CVT, particularly the CVT actuator and/or the first transmission, particularly the first transmission clutch, and/or optionally the second transmission, particularly the second transmission clutch (and/or the third transmission, e.g. via the third transmission clutch) for selecting a transmission ratio of the transmission system, e.g. by selectively coupling or decoupling the first clutch and/or actuating the CVT in response to receiving the first and/or second shift signal. The controller allows for simplified operation of the transmission system. Also, by having the CVT and first transmissions connected in series, there is no risk of lock-up of the transmission system when actuating the CVT, and the first clutch (and optionally the second and the third clutch) independently and/or simultaneously.

Optionally, the transmission system comprises a first housing holding the CVT and the first transmission, wherein the control unit is arranged in the first housing. Hence, the first housing can include the CVT, the first transmission and the control unit. Optionally, the transmission system further comprises a second housing, separate from the first housing, holding the second transmission and/or the third transmission. The first housing may be configured to be arranged at or near a crank of the bicycle, such that the CVT and the first transmission together operate as a crank transmission. The first housing may correspond to a crank housing. The second housing may be configured to be arranged at or near a hub of a drive wheel of the bicycle, e.g. a rear wheel hub, such that the second transmission and/or the third transmission operate as a hub transmission. The second housing may hence correspond to a hub housing. It will be appreciated that the inverse configuration is also envisioned, i.e. that the first housing is arranged at the wheel hub and the second housing at the crank. The control unit is preferably held by either the first housing or the second housing. The control unit and the CVT are preferably contained by the same housing, e.g. the first housing or crank housing. The CVT and the first transmission are preferably contained by the same housing, e.g. the first housing or crank housing.

Optionally, the transmission system comprises a battery connected to power the control unit and/or one or more sensors and/or actuators of the transmission system. The battery is for example included in the first housing or the second housing of the transmission system, or externally arranged from the first and second housings. The battery, particularly when externally arranged, may optionally additionally power a propulsion motor of the bicycle. The transmission system may comprise a wired connection between the battery and the control unit and/or between the battery and one or more of the one or more sensors and/or actuators of the bicycle. The battery may optionally be non-rechargeable. The battery may also be non-replaceable. The power consumption of the sensors and/or actuators of the transmission system may for example be so low that the recharging of the battery is not needed, while a battery life time of the battery is sufficient to substantially correspond to the lifetime of other e.g. mechanical, parts of the transmission system.

Optionally, the transmission system comprises an actuator battery connected for powering, e.g. only, one or more transmission actuators of the transmission system, and an additional, separate, control unit battery connected for powering, e.g. only, the control unit. Each actuator optionally includes a respective actuator battery. The actuator battery may additionally, or alternatively, power, e.g. only, one or more sensors of the transmission system. The transmission actuator(s) may be configured to require less power than the control unit, such that the transmission actuator(s) may hence be provided with a dedicated actuator battery which is relatively small compared to the control unit battery. The actuator battery may for example be charged by locally harvested power, e.g. by a solar cell mounted to the bicycle. The actuator battery may be included in a common housing with the CVT, e.g. the first housing. The control unit battery may be provided external to the first and second housing, and may particularly correspond to a propulsion battery of the (e-)bicycle, which propulsion battery also powers an electric propulsion motor of the bicycle. The control unit battery, e.g. corresponding to the propulsion battery, may be charged separately from the actuator battery, e.g. by a connection to the mains.

Optionally, the control unit is arranged to be wirelessly connected to a user-operable shifter. The shifter may generate and wirelessly transmit signals to the controller. The control unit may accordingly comprise an input antenna for receiving a wireless shift signal, and one or more outputs for respectively controlling one or more actuators. Alternatively, the control unit is arranged to be wiredly connected to a user-operable shifter.

Optionally, the control unit comprises an electric connection interface for electrically, e.g. wiredly, connecting the control unit to any sensor and/or actuator of the transmission system of the bicycle. The electric connection may transmit electronic communication signals and/or electric power signals. For example, the CVT and the first transmission may be configured as a crank transmission of a bicycle located at or near a crank of the bicycle, wherein a further, e.g. separate, transmission, e.g. the second and/or third transmission, may be provided as a hub transmission at or near a driven wheel hub of the bicycle. The electric connection may be configured to, e.g. wiredly, connect the control unit, which is part of a first one of the crank transmission or the hub transmission, to a second one of the hub transmission or the crank transmission. Hence, the control unit may receive and process a shift signal from a user-operable shifter, and in turn transmit a control signal to the hub transmission actuator and/or the crank transmission actuator to control operation of the hub transmission and/or the crank transmission based on the received shift signal. The electric connection between control unit and the transmission actuator is preferably wired, and is optionally releasable. Alternatively, the control unit may comprises a wireless connection interface for wirelessly connecting the control unit to any transmission actuator of the bicycle.

Optionally, the first shift signal is an upshift signal and the second shift signal is a downshift signal, and the controller is configured to selectively control the CVT and/or the first (and/or second and/or third) clutch for selecting the next higher system transmission ratio in response to receiving the upshift signal, and for selecting the next lower system transmission ratio in response to receiving the downshift signal. Hence, the rider only needs to provide the upshift signal or the downshift signal, e.g. by means of one or more controls, levers, switches or the like. Preferably, the first and second shift signals are electronic signals. The first and/or second and/or third clutch can include a first and/or second and/or third actuator, respectively, for electrically actuating the respective clutch to couple or decouple. The controller then controls the first and second (and third) actuators in response to the upshift or downshift signal provided by the rider. Depending on the system transmission ratio used at that point in time, the next higher system transmission ratio can be achieved by actuating the first actuator and/or the second actuator (and/or third actuator). The controller is configured to select and actuate the appropriate actuator. Thus, shifting is simplified for the user.

Optionally, the first shift signal is an upshift signal and the second shift signal is a downshift signal, and the controller is configured to selectively control the CVT and the first clutch (and/or second clutch and/or third clutch) for selecting the second next, third next, fourth next higher or lower system transmission ratio in response to receiving a bail-out signal, the bail-out signal e.g. comprising the upshift signal and downshift signal at the same time, or within a specified time-interval, typically smaller than 1 s.

Optionally, the first and second shift signals are wireless signals, and wherein the control unit is arranged to receive the wireless shift signals.

Optionally, the system comprises one or more actuators, particularly one or more electric actuators, arranged for actuating the CVT and the first clutch (and second and third clutches).

Optionally, the one or more actuators are operatively connected to the control unit.

Optionally, the control unit and the one or more actuators are arranged to wirelessly communicate. Optionally, the control unit and the one or more actuators are arranged to wiredly communicate. It will be appreciated that combination of wireless and wired communication is envisioned.

Optionally, the system comprises a torque sensor for measuring an input torque at the input, wherein the torque sensor is operatively connected to the control unit. The torque sensor may for example be arranged to measure a torque at a crank and/or at a crankshaft.

Optionally, the torque sensor is integrated in the transmission system.

Optionally, the control unit and the torque sensor are arranged to wirelessly communicate.

Optionally, the torque sensor is arranged to be powered by a rotary motion of a crank and/or crankshaft about a crank axis.

Optionally, the torque sensor is arranged to be wirelessly powered.

Optionally, the system comprises an electric motor, for propelling, or assist propelling, of the vehicle. Optionally, the electric motor is connected to the CVT input, Optionally, the electric motor is connected between the CVT and the first transmission. Optionally, the electric motor is connected to the system output. Optionally, the electric motor is connected between the first transmission and the second transmission. Optionally, the electric motor is connected between the first transmission and the system output. Optionally, the electric motor is connected between the second transmission and the system output.

Optionally, the system comprises a battery arranged for powering the electric motor, and further arrange for powering the one or more actuators and/or sensors.

It will be appreciated that the CVT can be any type of CVT. Optionally, the continuously variable transmission is of a ratcheting type, e.g. using freewheel or one-way drive modules. Optionally, the continuously variable transmission is of a friction type, toroidal type, or pulley type.

According to a further aspect is provided a distributed transmission system, comprising a crank assembly including the CVT and the first transmission as described herein, and a hub assembly comprising the second transmission and/or the third transmission as described herein. The CVT and the first transmission can be included in a common housing, such as a crank housing. The second transmission and/or the third transmission can be included in a separate hub housing, e.g. at least partly formed by a wheel hub shell, separate from the crank housing.

According to a further aspect is provided a distributed transmission system, comprising a crank assembly including the second transmission and/or the third transmission as described herein, and a hub assembly comprising the CVT and the first transmission as described herein. The CVT and the first transmission can be included in a common housing, e.g. at least partly formed by the wheel hub shell. The second transmission and/or the third transmission can be included in a common crank housing.

According to a further aspect is provided a distributed transmission system, comprising a crank assembly including the CVT as described herein, and a hub assembly comprising the first transmission and/or the second transmission and/or the third transmission as described herein. The CVT can be included in a crank housing. The first transmission and/or the second and/or third transmissions can be included in a common hub housing, e.g. at least partly formed by the wheel hub shell, separate from the crank housing.

According to a further aspect is provided a distributed transmission system, comprising a crank assembly including the first transmission and/or the second transmission as described herein, and a hub assembly comprising the CVT as described herein. The CVT and the first transmission can be included in a common housing, e.g. the wheel hub shell. The first and/or second transmissions can be included in a crank housing.

Optionally, the distributed transmission system includes a control unit, e.g. as described herein, configured for receiving a shift signal from a user-operable shifter device, and for controlling the hub transmission and/or the crank transmission based on the received shift signal.

Optionally, the crank housing includes the control unit, which control unit is configured for controlling the crank transmission, and is further, e.g. wiredly or wirelessly, connected to the hub assembly for controlling the hub transmission. Alternatively, the hub housing may include the control unit, which control unit is configured for controlling the hub transmission, and is further, e.g. wiredly or wirelessly, connected to the crank transmission system for controlling the crank transmission. It will also be appreciated that, alternatively, both the crank housing and the hub housing may include a respective control unit.

Optionally, the crank housing includes a battery, e.g. as described herein, which battery is connected to power a sensor and/or actuator of the crank transmission and which battery is further connected to the hub assembly for powering a sensor and/or actuator of the hub transmission. The hub housing, hence, need not to contain a battery. It may be preferred to provide the battery, being a relatively heavy component, within the crank housing, to improve handling of the bicycle. The crank housing may include a charging port, for allowing the battery to be charged by an external source. The crank housing may also include an electric propulsion motor, e.g. being powered by the battery. Alternatively, the hub housing may include a battery as described herein, which battery is connected to power a sensor and/or actuator of the hub assembly and is further is connected to the crank transmission system for powering a sensor and/or actuator of the crank transmission system. The crank housing, hence, need not to contain a battery. It will also be appreciated that both the crank housing and the hub housing may include respective batteries as described herein. The battery of the crank transmission and/or the hub transmission may be rechargeable, e.g. by connection to the mains or locally by an energy harvesting device such as a solar panel. The battery may alternatively be non-rechargeable. The battery may alternatively be provided external to the crank housing and the hub housing.

Optionally, only one of the crank housing and the hub housing includes the battery, and only another one of the crank housing and the hub housing includes the control unit, wherein the battery is connected to power the control unit, e.g. through a wired connection.

Optionally, the distributed transmission system may comprise a wired connection between the crank assembly and the hub assembly, particularly between on the one hand the control unit and/or battery being held by one of the crank housing and the hub housing, and on the other hand the one or more sensors and/or actuators being held by another one of the crank housing and the hub housing. The electric connection may hence be wired, but may alternatively or additionally be wireless. For example, the control unit and the one or more sensors and/or actuators may be wirelessly connected, whereas the battery and the sensors and/or actuators are wiredly connected. One or both of the crank assembly and the hub assembly may for example comprise a connector interface for releasably connecting an electric wire so as to directly connect the hub assembly with the crank assembly. Hence a modular distributed transmission system may be obtained, in which multiple transmission can easily be communicatively connected to each other.

According to an aspect is provided a wheel hub assembly for a bicycle, particularly for a distributed transmission system as described herein, comprising a hub housing holding one or more sensors and/or actuators, and an electric connection interface for electrically connecting the one or more sensors and/or actuators with an externally arranged electric component, e.g. an external power source, external control unit and/or external user-operable shifter, the electric connection interface being arranged for transmitting electric power and/or electronic communication signals between the external electric component and one or more sensors and/or actuators. The one or more sensors and/or actuators may include, for example, a speed sensor, a position sensor, a brake sensor, a shift actuator, a torque sensor, a propulsion motor, and/or a brake actuator.

Optionally, the hub housing includes a driver for being connected to a torque transfer member and a hub shell for being connected to a driven wheel, wherein the hub assembly comprises a hub transmission being selectively operable according to at least two different transmission ratios, and wherein the hub transmission is connected between the driver and the hub shell, and wherein the one or more sensors and/or actuators include a shift actuator for operating the hub transmission for switching from one transmission ratio of the at least two transmission ratios to another transmission ratio of the at least two transmission ratios. Accordingly, the aspect may particularly provide a hub assembly, e.g. for a distributed transmission system as described herein.

Hence, the hub assembly can be, for example wiredly, connected to the crank assembly of the distributed transmission system, which crank assembly includes, e.g. holds within the crank housing, the power source, e.g. battery, and/or a control unit for powering and/or controlling the hub shift actuator. The hub assembly may particularly include a transmission as described herein, e.g. one or more of the CVT, the first transmission, the second transmission and the third transmission.

The hub assembly can for example be connected to a crank assembly arranged at a crank of the bicycle, which crank assembly includes, e.g. holds within the crank housing, a battery and/or a control unit for powering and/or controlling any sensor and/or actuator of the hub assembly via the electric connection interface.

Optionally, the electric connection interface is arranged for providing a wired electric connection between the one or more sensors and/or actuators and the external electric component. The external electric component may include one or more of an external control unit and/or an external power source such as a solar panel and/or battery, an external user-operable shifter, an external transmission such as a derailleur or crank transmission.

Optionally, the connection interface comprises a first connection part having a first electric contact being electrically connected to the one or more sensors and/or actuators in the hub assembly; and a second connection part, being releasable connectable to the first connection part, and having a second electric contact arranged for being electrically connected to an external electric component, such as to an external power source and/or external control unit, wherein the first and second electric contacts are arranged for being in contact with one another so as to conduct electric signals therebetween when the first and second connection parts are mechanically coupled to each other.

Optionally, the second connection part includes a battery electrically connected to the second contact. Hence, the battery held by the second connection part, may be electrically connectable to the sensors and/or actuators held by the housing, via the electric connection interface. Optionally, the second connection part includes a control unit. Hence, the control unit held by the second connection part, may be electrically connectable to the sensors and/or actuators held by the housing, via the electric connection interface.

Optionally, the hub assembly comprises a third connection part arranged for being mechanically, e.g. releasably, and electrically connected or connectable to the second connection part.

Optionally, the third connection part includes an electrically conductive wire for providing a wired conduction path between the second electric contact and the external electric component. The electrically conductive wire may for example be releasably connectable to the second connection part by means of a plug/socket connection. Optionally, the electrically conductive wire is fixed to or integrated with the second connection part.

Optionally, the third connection part includes a wireless transmitter and/or receiver for providing a wireless communication channel between the third connection part and the external electric component. The wireless transmitter may for example be releasably connectable to the second connection part by means of a plug/socket connection. Optionally, the wireless transmitter is fixed to or integrated with the second connection part.

Optionally, the first and second electric contacts are arranged to provide at least two separate transmission channels between the first connection part and the second connection part, preferably at least three separate transmission channels, more preferably at least four separate transmission channels. Hence, multiple sensors and/or actuators held by the hub housing can separately be powered and/or be communicatively connected with external electrical components through the connection interface.

Optionally, the first connection part and the second connection part both include a through hole for accommodating a thru-axle therethrough. The thru-axle may be arranged for mounting the hub assembly, and a wheel associated therewith, to a frame of the bicycle.

Optionally, the first connection part is fixed to or integrated with a wheel axle, and the second connection part is fixed to or integrated with a hub axle end cap. The first contact and the second contact can be brought in contact with each other by attaching the end cap to the first connection part, e.g. the wheel axle, and can be released by removing the end cap therefrom.

Optionally, the first and second connection parts are coaxially arranged with respect to a wheel axis. The wheel axis may be defined as the axis about which the wheel associated with the hub assembly is rotatable.

Optionally, the first and second contacts are radially oriented with respect to the wheel axis. Hence, electric current can be conducted between the first and second contacts in radial direction with respect to the wheel axis. Optionally, the first and second contacts are axially oriented with respect to the wheel axis. Hence, electric current can be conducted between the first and second contacts in parallel to the wheel axis.

Optionally, the first contact is ring-shaped and extends around the wheel axis. Optionally, the second contact is ring-shaped and extends, in use when the first and second connection parts are connected, around the wheel axis. Hence, a contact face between the first and second contacts may accordingly be ring-shaped, and extending, in use, around the wheel axis.

Optionally, the first connection part and the second connection part are rotatable relative to one another about the wheel axis while the first contact and second contact are in contact.

Optionally, the hub assembly comprises a bearing arranged between the driver and the wheel axle for allowing the driver to rotate relative to the wheel axle about the wheel axis, wherein the first connection part is arranged, in radial direction, between the bearing and the wheel axle. Hence, an electric conduction path extending between the first contact and the one or more sensors and/or actuators can be provided, running between the bearing and the wheel axle.

Optionally, the bearing is axially engaged by the second connection part.

Optionally, in use when the first connection part and the second connection parts are connected, a seal is arranged between the first connection part and the second connection part. The seal may for example include a resilient O-ring coaxially provided between the first connection part and the second connection part, and extending around the wheel axis.

Optionally, the second contact is configured for being electrically connected to, e.g. electronics of, a rear derailleur. Hence, sensors and/or actuators held by the hub housing may be communicatively and/or chargingly connected to the rear derailleur. The rear derailleur may for example include a battery, e.g. mounted to a derailleur body, which battery can be connected to power the sensors and/or actuators held by the hub housing. Hence, no additional battery may be required within the hub housing. Alternatively, the derailleur may be powered by a battery held by the hub housing. Also, control signals may be transmitted between the derailleur and sensors and/or actuators held by the hub housing.

Optionally, the second contact is configured for being, e.g. directly, electrically connected to, e.g. electronics of, the crank transmission system. Hence, sensors and/or actuators held by the hub housing may be communicatively and/or chargingly connected to one or more sensors and/or actuators of the crank assembly.

Optionally, the second contact is configured for being electrically connected to a user-operable shifter. The user-operable shifter may for example be provided at handlebar of the bicycle, for allowing a user to review and/or operate the one or more sensors and/or actuators of the hub assembly.

According to an aspect is provided a crank assembly for a bicycle, particularly for a distributed transmission system as described herein, comprising a hub housing holding one or more sensors and/or actuators, and an electric connection interface for electrically connecting the one or more sensors and/or actuators with an externally arranged electric component, e.g. an external power source, external control unit and/or external user-operable shifter, the electric connection interface being arranged for transmitting electric power and/or electronic communication signals between the external electric component and one or more sensors and/or actuators.

The one or more sensors and/or actuators may include, for example, a speed sensor, a position sensor, a brake sensor, a shift actuator, a torque sensor, a propulsion motor, and/or a brake actuator.

Optionally, the crank assembly comprises an input shaft connected to a crank and an output shaft connected to the torque transfer member, and a crank transmission, being selectively operable according to at least two different transmission ratios, and wherein the crank transmission is connected between the input shaft and the output shaft, and wherein the one or more sensors and/or actuators include a shift actuator for operating the crank transmission for switching from one transmission ratio of the at least two transmission ratios to another transmission ratio of the at least two transmission ratios. Accordingly, the aspect may particularly provide a crank transmission system, e.g. for a distributed transmission system as described herein.

Hence, the crank assembly can be, for example be wiredly, connected to the hub assembly of the distributed transmission system, which hub assembly includes, e.g. holds within the hub housing, the power source, e.g. battery, and/or the control unit for powering and/or controlling any sensor and/or actuator of the crank assembly. It will be appreciated that, in addition or alternatively to the crank shift actuator, the crank assembly may include other sensors and/or actuators, e.g. contained by the crank housing. The crank assembly may particularly include a transmission as described herein, e.g. one or more of the CVT, the first transmission, the second transmission and the third transmission.

Optionally, the input shaft and the output shaft are rotatable around a common drive axis, and wherein the crank assembly comprises an electric propulsion motor for propelling the bicycle connected to the input shaft or the output shaft, wherein the electric propulsion motor has a rotatable output member that is rotatable about an electric motor output axis which extends transverse to the drive axis. Hence, a particular compact setup can be obtained.

Optionally, the electric motor is angularly spaced from the intermediate shaft.

According to a further aspect is provided a bicycle comprising a transmission system, e.g. a distributed transmission system, as described herein, or a hub assembly and/or a crank assembly as described herein. The bicycle may for example comprise a distributed transmission system as described herein.

Optionally, the bicycle comprises a torque transfer system having a torque transfer member, such as a chain or belt or shaft, wherein a crank drives an input of the torque transfer system, and wherein an output of the torque transfer system drives a driven wheel of the bicycle, wherein the transmission system is arranged between the crank and the input of the torque transfer system. The CVT and the first transmission (and optionally the second transmission and the third transmission) may be housed in a common housing placed at the location of the crank.

Optionally, the bicycle comprises a torque transfer system having a torque transfer member, such as a chain or belt or shaft wherein a crank drives an input of the torque transfer system, and wherein an output of the torque transfer system drives a driven wheel of the bicycle, wherein the transmission system is arranged between the output of the torque transfer system and a wheel hub of the driven wheel. The CVT and the first transmission (and optionally the second transmission and the third transmission) may be housed in a common housing at the wheel axle.

Optionally, the bicycle comprises a torque transfer system having a torque transfer member, such as a chain or belt or shaft wherein a crank drives an input of the torque transfer system, and wherein an output of the torque transfer system drives a driven wheel of the bicycle, wherein the CVT and the first transmission of the transmission system are arranged between the crank and the input of the torque transfer system, and wherein the second transmission of the transmission system is arranged between the output of the torque transfer system and a wheel hub of the driven wheel. The CVT and the first transmission may be housed at the location of the crank, and the second transmission may be housed at the wheel axle.

Optionally, the bicycle comprises a torque transfer system having a torque transfer member, such as a chain or belt or shaft wherein a crank drives an input of the torque transfer system, and wherein an output of the torque transfer system drives a driven wheel of the bicycle, wherein the CVT and the first transmission of the transmission system are arranged between the crank and the input of the torque transfer system, and wherein the second transmission of the transmission system is arranged between the output of the torque transfer system and a wheel hub of the driven wheel. The CVT and the first transmission may be housed in a common housing placed at the location of the crank, and the second transmission may be housed at the wheel axle.

Optionally, the CVT is arranged between the first transmission and the second transmission. Optionally, the CVT is arranged between the second transmission and the third transmission. Optionally, the CVT is arranged between a system input and the first transmission or between the second transmission and a system output. Optionally, the CVT is arranged between a system input and the first transmission or between the third transmission and a system output. The CVT can be a ratcheting type of CVT, e.g. using freewheel or one-way drive modules. The CVT can be used for increasing the number of system transmission ratios. The CVT can be controlled to selectively operate at one of two or three (or more) distinct transmission ratios. The CVT can be controlled to operate at a first CVT transmission ratio and a second CVT transmission ratio. A ratio of the second CVT transmission ratio and the first CVT transmission ratio can be chosen to be, e.g. approximately, half of the ratio of the second transmission ratio and the first transmission ratio. The CVT can be controlled to operate at a first CVT transmission ratio, a second CVT transmission ratio and a third CVT transmission ratio. A ratio of the second CVT transmission ratio and the first CVT transmission ratio can be chosen to be, e.g. approximately, one third of the ratio of the second transmission ratio and the first transmission ratio, and a ratio of the third CVT transmission ratio and the first CVT transmission ratio can be chosen to be, e.g. approximately, two third of the ratio of the second transmission ratio and the first transmission ratio.

The CVT may for example comprise a first drive element that is rotatable about a first axis; a second drive element that is rotatable about a second axis parallel to the first axis, wherein the first drive element and the second drive element are movable relative to each other in a direction transverse to the first and second axis; and first coupling elements provided at a constant first radius from the first axis and at a variable second radius from the second axis, for transferring torque between the first drive element and the second drive element.

The CVT may be configured to be operable according to any transmission ratio within a continuous range of CVT transmission ratios. The CVT may particularly be configured to be operable according to a predetermined finite set of transmission ratios within the continuous range of CVT transmission ratios.

A transmission ratio of a transmission as described herein, is particularly an output speed of the transmission divided by an input speed of the transmission.

According to an aspect is provided a gearless transmission unit such as for a bicycle, providing at least two discrete selectable transmission ratios, wherein a first of the at least two transmission ratios is provided by a first endless drive member, and wherein a second of the at least two transmission ratios is provided by a second endless drive member.

Optionally, the first and second endless drive members are placed in parallel between an input and an output of the gearless transmission unit, and the gearless transmission unit includes a selector for selecting power transmission via the first or the second endless drive member.

Optionally, the gearless transmission unit includes a clutch for selecting power transmission via the first endless drive member or the second endless drive member.

Optionally, the gearless transmission unit further includes a third endless drive member and a fourth endless drive member, wherein the third and fourth endless drive members are placed in parallel between an output of the first and second endless drive members and an output of the gearless transmission unit, and the gearless transmission unit includes a selector for selecting power transmission via the third or the fourth endless drive member.

Optionally, the gearless transmission unit includes a clutch for selecting power transmission via the third endless drive member or the fourth endless drive member.

Optionally, the clutch is arranged to be coupled and/or decoupled under load. The clutch is for example a load-shifting clutch.

Optionally, at least one of the first, second, third and fourth endless drive members is non-lubricated. In particular, each endless drive member of the gearless transmission unit may be non-lubricated. Hence, no lubrication fluid is provided on at least one of the first endless drive member, the second endless drive member, the third endless drive member and the fourth endless drive member, particularly on all four of said endless drive members. A dry drive system can hence be obtained.

Optionally, the at least one of the first, second, third and fourth endless drive members comprises, e.g. is, a dry belt or a dry chain.

Optionally, at least one of the first, second, third and fourth endless drive members comprises a lubricated chain. In particular, and as alternative to a dry drive system, each endless drive member of the gearless transmission unit may be lubricated, e.g. with a lubrication fluid such as an oil.

Optionally, the gearless transmission unit includes a continuously variable transmission.

According to an aspect, each of the transmissions provided by the transmission system as described herein is oil-free, preferably lubrication-free.

According to an aspect is provided a hub assembly for a bicycle including the gearless transmission unit.

According to an aspect is provided a crank assembly for a bicycle including the gearless transmission unit.

According to an aspect is provided a bicycle including the gearless transmission unit.

It will be appreciated that any one or more of the above aspects, features and options can be combined. It will be appreciated that any one of the options described in view of one of the aspects can be applied equally to any of the other aspects. It will also be clear that all aspects, features and options described in view of the transmissions system apply equally to the bicycle. It will also be clear that all aspects, features and options described in view of the control device and control system apply equally to the transmission system, assembly, and bicycle.

BRIEF DESCRIPTION OF THE DRAWING

The invention will further be elucidated on the basis of exemplary embodiments which are represented in a drawing. The exemplary embodiments are given by way of non-limitative illustration. It is noted that the figures are only schematic representations of embodiments of the invention that are given by way of non-limiting example.

In the drawing.

DETAILED DESCRIPTION

Figure 1A:
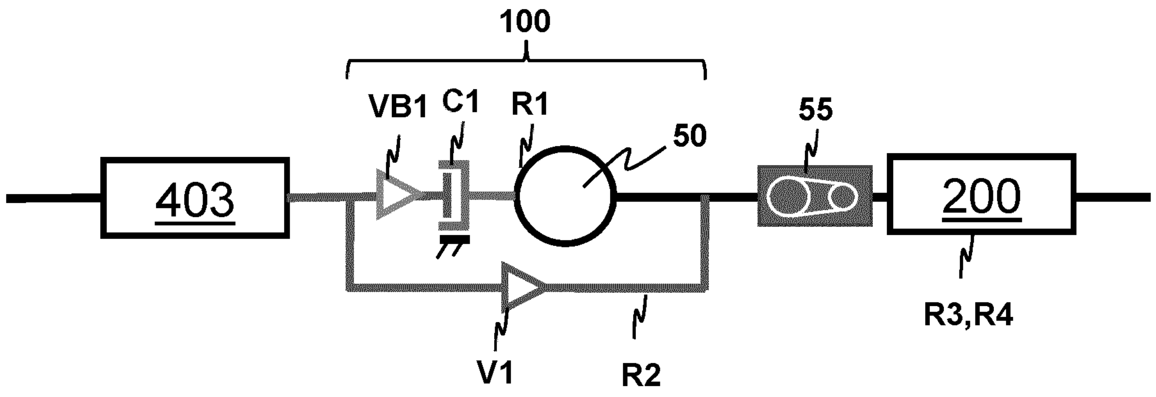
FIGS. 1A-1B show schematic examples of a transmission system.
Figure 1B:
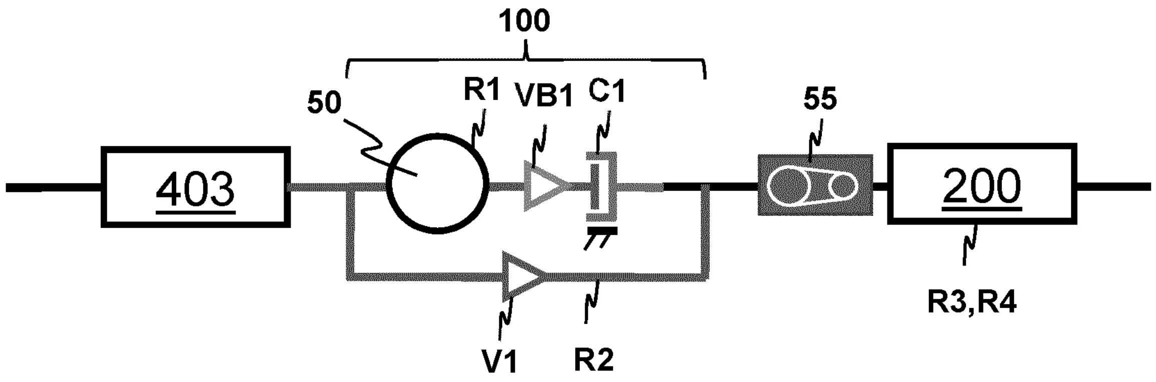

FIGS. 1A and 1B show exemplary transmission systems 1, wherein a continuously variable transmission (CVT) 403 is connected in series with a first transmission 100. Here, an output of the CVT 403 is connected to an input of the first transmission 100. However, it is also possible that an output of the first transmission 100 is connected to an input of the CVT 403. The first transmission 100 is operable according to a first transmission ratio and a second transmission ratio. In this example, the first transmission 100 includes a planetary gear set 50. In this example, the planetary gear set is configured to selectively provide in a first mode a 1:1 transmission ratio or in a second mode a speed-up or speed-down transmission ratio.

In FIGS. 1A and 1B, the first transmission 100 is connected to a second transmission 200 via an endless drive member 55, e.g. a chain, belt, or cardan drive. The second transmission can be a hub transmission of the bicycle. The second transmission 200 is operable according to a third transmission ratio and a fourth transmission ratio. The second transmission 200 can e.g. include a second planetary gear set. The second planetary gear set can be configured to selectively provide in a third mode a 1:1 transmission ratio or in a fourth mode a speed-up or speed-down transmission ratio.

In the exemplary arrangement of FIGS. 1A, 1B, the CVT 403 and the first transmission 100 may be configured to be used as a crank transmission, e.g. between a crank and a front chain wheel of a bicycle. The CVT 403 and the first transmission 100 can e.g. be provided in a common housing, such as a crank housing of a bicycle. The second transmission may be configured to be used as a hub transmission, e.g. between a rear sprocket and wheel hub of the bicycle. The endless drive member 55 may for example connect the front chain wheel and the rear sprocket, for transmitting torque from the front chain wheel to the rear sprocket.

FIG. 2 shows an example of a transmission system 1, such as for a two wheeled bicycle. The transmission system 1 includes an input I and an output O. The input I can for example be connected to a crank of the bicycle. The output O can for example be connected to a hub of a driven wheel of the bicycle. Between the input I and the output O, the system includes the first transmission 100, the CVT 403 and the second transmission 200. The first transmission 100, CVT 403 and second transmission 200 are connected to one another in series. A first input 101 of the first transmission 100 is connected to the system input I. A second output 202 of the second transmission 200 is connected to the system output O. A first output 102 of the first transmission 100 is connected to an input 404 of the CVT 403. An output 405 of the CVT is connected to the second input 201 of the second transmission 200. It will be appreciated that the CVT output 405 and the second input 201 may be connected to each other via an intermediate member, such as a chain, belt or intermediate shaft as shown in FIGS. 1A, 1B. It will be appreciated that also in this example, the CVT may be positioned upstream of the first transmission 100 as shown in FIGS. 1A, 1B.

The first transmission 100 is operable according to a first transmission ratio and a second transmission ratio. Similarly, the second transmission 200 is operable according to a third transmission ratio and a fourth transmission ratio. The first and second transmissions 100, 200 may include respective gearing, e.g. one or more gears, for providing a reduction or increase transmission ratio between the first input 101 and first output 102, and between the second input 201 and second output 202, respectively. The serial arrangement of the first and second transmissions 100, 200 can thus provide for four distinct system transmission ratios between the system input I and the system output O.

To shift between the first transmission ratio and the second transmission ratio, the first transmission 100 can include a first clutch, in this example a load-shifting clutch, C1. Similarly, the second transmission 100 can include a second clutch, in this example a load-shifting clutch, C2, for selectively shifting between the third transmission ratio and the fourth transmission ratio of the second transmission 200. The first load-shifting clutch C1 and the second load-shifting clutch C2 are thus serially arranged between the system input I and the system output O.

The first transmission 100 has two parallel transmission paths between the first input 101 and first output 102, namely a first transmission path 100A and a second transmission path 100B. At least one of the first and second transmission paths 100A, 100B includes the first load-shifting clutch C1. Also, at least one of the parallel transmission paths 100A, 100B includes a transmission gearing. In this example, the first transmission path 100A includes a first gearing R1 arranged for providing the first transmission ratio, and the second transmission path 100B includes a second gearing R2 for providing the second transmission ratio.

Similarly, the second transmission 200 has two parallel transmission paths between the second input 201 and the second output 202, namely a third transmission path 200A and a fourth transmission path 200B. at least one of the third and fourth transmission paths 200A, 200B includes the second load-shifting clutch C2. Also, at least one of the parallel transmission paths 200A, 200B of the second transmission 200 includes a transmission gearing. In this example, the third transmission path 200A includes a third gearing R3 arranged for providing the third transmission ratio, and the fourth transmission path 200B includes a gearing fourth R4 for providing the fourth transmission ratio.

The load-shifting clutches C1 and C2, can be used to select an appropriate transmission path between the system input I and system output O. More particular, the first load-shifting clutch C1 can be used to selectively switch between the first 100A and second 100B parallel transmission paths of the first transmission 100, and the second load-shifting clutch C2 can be used to selectively switch between the third 200A and fourth 200B parallel transmission paths of the second transmission 200.

The load-shifting clutches include at least two states, e.g. a coupled state and a decoupled state, wherein the coupled state couples the clutch input with the clutch output to transmit torque through the clutch, and the decoupled state decouples the clutch input from the clutch output to transmit no torque through the clutch. In the decoupled state, the load shifting clutches C1, C2 enable torque to be transmitted through different, parallel, transmission path.

In the coupled state of the first load-shifting clutch C1, torque can be transmitted through the second transmission path 100B from the system input I to the first output 102. In the decoupled state, torque can be transmitted through the first transmission path 100A from the system input I to the first output 102. Similarly, in the coupled state of the second load-shifting clutch C2, torque can be transmitted through the fourth transmission path 200B from the second input 201 to the system output O. In the decoupled state, torque can be transmitted through the third transmission path 200A from the first input 201 to the system output O.

In this example, the load-shifting clutches C1, C2 are provided in, respectively, the second transmission path 100B and the fourth transmission path 200B, but it will be appreciated that the first load-shifting clutches C1, C2 can also be provided in, respectively, the first transmission path 100A and the third transmission path 200A. The first load-shifting clutch C1 is here provided between the first input 101 and the second gearing R2, but the first load-shifting clutch C1 can also be provided between the second gearing R2 and the first output 102. Similarly, the second load-shifting clutch C2 is here provided between the second input 201 and the fourth gearing R4, but the second load-shifting clutch C2 can also be provided between the fourth gearing R4 and the second output 202.

Here, the first transmission path 100A includes a first freewheel clutch V1. The first freewheel clutch V1 can be overrun, e.g. when torque is transmitted through the second transmission path 100B, e.g. when the first output 102 rotates faster than the first input 101. Here, the third transmission path 200A includes a third freewheel clutch V2. The third freewheel clutch V2 can be overrun, e.g. when torque is transmitted through the fourth transmission path 200B, e.g. when the second output 202 rotates faster than the second input 201. The freewheel clutches V1, V2 are preferably low friction when overrun to reduce losses.

Here the freewheel clutches V1, V2 are connected to an input of respective first and third gearing R1, R3, but it will be appreciated that the freewheel clutches V1, V2 can also be connected to an output of the respective first and third gearing R1, R3.

The load-shifting clutches C1, C2 are, at least in this example, particularly arranged to be coupled and decoupled under load, i.e. while torque is transferred through the load-shifting clutch. The load-shifting clutches C1, C2 are for instance form-closed clutches. It will be appreciated that any of the load-shifting clutches may also be force-closed clutches, arranged to transfer torque in at least one rotational direction.

It will be appreciated that any of the clutches C1, C2 as described herein, e.g. in conjunction with any of the figures, may particularly be a load-shifting clutch as described in WO2018/199757A2, WO2020/085911A2, or WO2021/080431A1, incorporated herein by reference in their entirety.

Here, the first transmission 100 and the second transmission 200 each comprise a further clutch. In this example, the first transmission 100 comprises a second freewheel clutch VB1, and the second transmission 200 comprises a fourth freewheel clutch VB2. The second and fourth freewheel clutches VB1, VB2 are, here, connected to the respective inputs of the load-shifting clutches C1, C2, but it will be appreciated that the freewheel clutches VB1 and VB2 can also be connected to the respective outputs of the load-shifting clutches C1, C2. Alternatively, the freewheel clutches VB1, VB2 can be omitted, i.e. replaced by solid connections. It may be preferred to connect the second and fourth freewheel clutches VB1, VB2 to the respective inputs of the load-shifting clutches C1, C2, so that the outputs of the load shifting clutches C1, C2 can keep rotating even without inputting any torque through their the inputs. This may facilitate coupling and/or decoupling of the load-shifting clutches C1, C2. The clutches VB1 and VB2 can be particularly arranged to allow for a reverse rotation direction of the output O, i.e. opposite a driving rotation direction, relative to the input I. Here, the first clutch is serially connected in the second transmission path 100B between the second freewheel clutch VB1 and the second gearing R2. The second clutch is, similarly, serially connected in the fourth transmission path 200B between the fourth freewheel clutch VB2 and the fourth gearing R4. It will be appreciated that other arrangements are also possible. FIG. 4B shows an exemplary (coaxial) layout of the transmission system 1 of FIG. 4A.

In this example, the output 102 of the first transmission 100 is connected to an input 404 of the CVT 403. An output 405 of the CVT 403 is connected to the input 201 of the second transmission 200. The CVT 403 is arranged to provide a transmission ratio between the CVT input 404 and the CVT output 405. The CVT 403 can for example be operable according to at least a fifth transmission ratio and a sixth transmission ratio, and additionally a seventh transmission ratio etc. between the input 404 and output 405. The CVT 403 may hence be arranged to be operable according to various transmission ratios within a continuous range of CVT transmission ratios. The CVT 403 may particularly be arranged to be operable according to a predetermined finite set of transmission ratios within the continuous range of CVT transmission ratios. For example, the CVT 403 may be operable according to any selected one or the predetermined finite set of CVT transmission ratios, such as the fifth transmission ratio, the sixth transmission ratio, etc. The transmission system 1 may comprise a CVT actuator arranged for actuating a transmission ratio change of the CVT.

Figure 2A:
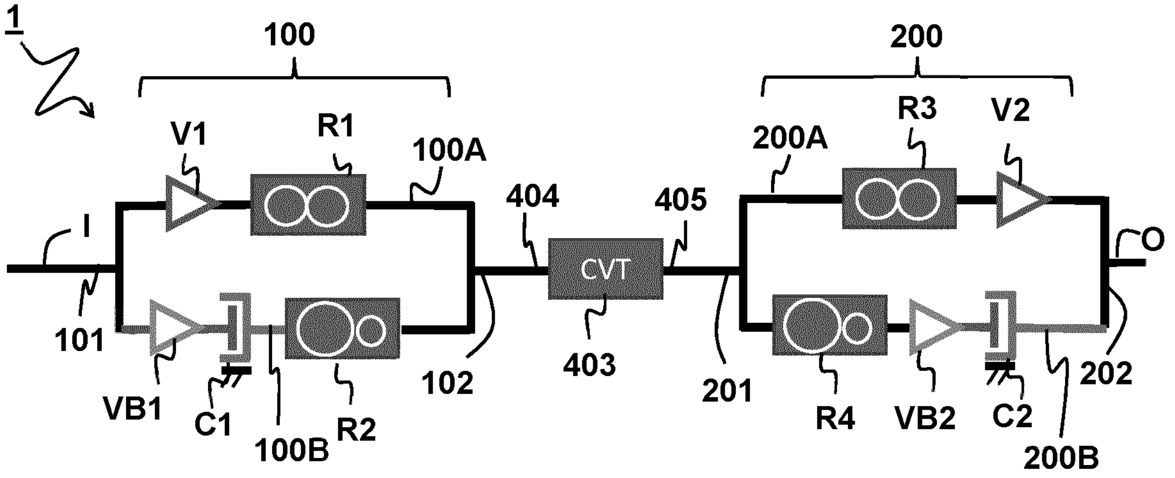
FIGS. 2A-2B show a schematic example of a transmission system.
Figure 2B:
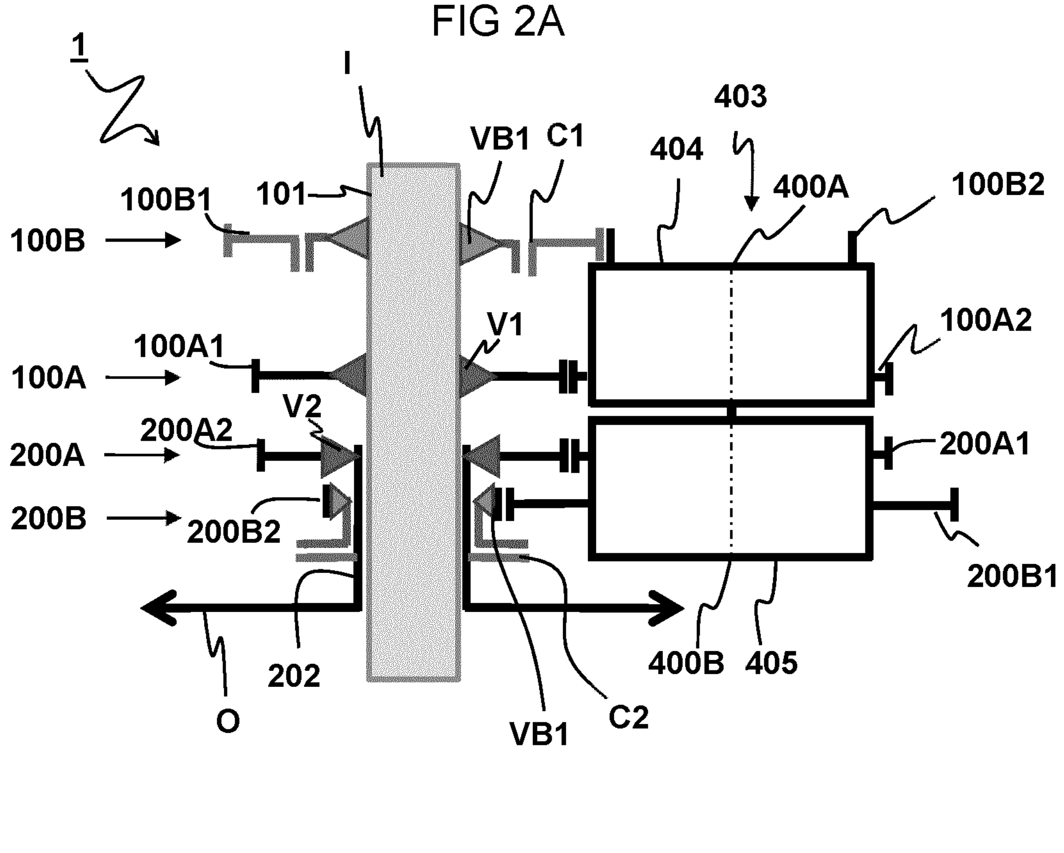

In this example, see particularly FIG. 2B, the CVT input 404 is connected to the output 102 of the first transmission 100, and is hereto provided with gear 100A2 for meshing with gear 100A1 to form the first transmission path 100A, and with gear 100B2 for meshing with gear 100B1 for forming the second transmission path 100B. The CVT output 405 is connected to the second input 201 of the second transmission 200, and is hereto provided with gear 200A1 for meshing with gear 200A2 for forming the third transmission path 200A and gear 200B1 for meshing with gear 200B2 for forming the fourth transmission path 200B.

The CVT 403 is in this example associated with an intermediate shaft 400, which is offset from the input shaft I and the output shaft O. The intermediate shaft 400 is in this example be a split shaft, comprising a first intermediate shaft 400A and a second intermediate shaft 400B that are rotatable relative to each other. The first transmission 100 is formed between the input shaft I and the first intermediate shaft 400A. The CVT 403 is configured to apply a transmission ratio, e.g. a seventh and eighth transmission ratio, between the first intermediate shaft 400A and the second intermediate shaft 400B. The second transmission 200 is formed between the intermediate shaft 400B and the output shaft O.

It will be appreciated that the CVT can be embodied in various ways. In this example, the CVT is a ratcheting type CVT, which uses freewheel or one-way drive modules. However, other types of CVTs can be used such as a pully-based CVT, a toroidal CVT, a hydrostatic CVT, an electrical CVT, a cone CVT, an epicyclic CVT, a friction-disk CVT, a magnetic CVT, etc. The CVT referred to herein may particularly be a CVT as described in co-pending application NL2028686, which is hereby incorporated by reference in its entirety.

The transmission system 1 as described thus far is operable according to various transmission ratios, wherein the CVT 403 provides for (pre)programmable transmission ratios. For example, table 1 shows an example of system transmission ratios that is obtainable by the transmission system 1 as shown in FIG. 2A. The example of table 1 shows a seven-speed transmission system 1 with a substantially constant transmission step size of about 1.25.

TABLE 1

| | C1 | C2 | RCVT | System transmission ratio |
|---|---|---|---|---|
| R1 = 0.90 | Decoupled | Decoupled | 1.00 | 0.8 (R1*R3*RCVT) |
| R2 = 1.28 | Decoupled | Decoupled | 1.25 | 1 (R1*R3*RCVT) |
| R3 = 0.89 | Coupled | Decoupled | 1.10 | 1.25 (R2*R3*RCVT) |
| R4 = 1.79 | Coupled | Decoupled | 1.37 | 1.56 (R2*R3*RCVT) |
| | Decoupled | Coupled | 1.21 | 1.95 (R1*R4*RCVT) |
| | Coupled | Coupled | 1.07 | 2.45 (R2*R4*RCVT) |
| | Coupled | Coupled | 1.33 | 3.05 (R2*R4*RCVT) |

In the example of table 1, each consecutive shift changes the system transmission ratio with, approximately, 25%. The transmission ratios of the CVT 403, RCVT, can be preprogrammed. The CVT can accordingly by controlled to switch from one preprogrammed transmission ratio to another.

Table 2 shows another example of system transmission ratios that are obtainable by a transmission system 1 as shown in FIG. 2A. This example shows a 10-speed transmission system 1, with a constant transmission step size of about 1.17.

TABLE 2

| | C1 | C2 | RCVT | System transmission ratio |
|---|---|---|---|---|
| R1 = 0.90 | Decoupled | Decoupled | 1.00 | 0.80 (R1*R3*RCVT) |
| R2 = 1.28 | Decoupled | Decoupled | 1.17 | 0.94 (R1*R3*RCVT) |
| R3 = 0.89 | Decoupled | Decoupled | 1.38 | 1.10 (R1*R3*RCVT) |
| R4 = 1.79 | Coupled | Decoupled | 1.12 | 1.28 (R2*R3*RCVT) |
| | Coupled | Decoupled | 1.32 | 1.50 (R2*R3*RCVT) |
| | Decoupled | Coupled | 1.09 | 1.75 (R1*R4*RCVT) |
| | Decoupled | Coupled | 1.27 | 2.05 (R1*R4*RCVT) |
| | Coupled | Coupled | 1.05 | 2.40 (R2*R4*RCVT) |
| | Coupled | Coupled | 1.23 | 2.81 (R2*R4*RCVT) |
| | Coupled | Coupled | 1.43 | 3.29 (R2*R4*RCVT) |

In the example of table 2, each consecutive shift changes the system transmission ratio with, approximately, 17%. The transmission ratios of the CVT 403 (RCVT) can be preprogrammed. The CVT can accordingly by controlled to switch from one preprogrammed transmission ratio to another.

Table 3 shows another example of system transmission ratios that are obtainable by a transmission system 1 as shown in FIG. 2A. This example shows a 16-speed transmission system 1, with a constant transmission step size of about 1.10.

TABLE 3

| | C1 | C2 | RCVT | System transmission ratio |
|---|---|---|---|---|
| R1 = 0.90 | Decoupled | Decoupled | 1.00 | 0.80 (R1*R3*RCVT) |
| R2 = 1.28 | Decoupled | Decoupled | 1.10 | 0.88 (R1*R3*RCVT) |
| R3 = 0.89 | Decoupled | Decoupled | 1.21 | 0.97 (R1*R3*RCVT) |
| R4 = 1.79 | Decoupled | Decoupled | 1.32 | 1.06 (R1*R3*RCVT) |
| | Coupled | Decoupled | 1.03 | 1.17 (R2*R3*RCVT) |
| | Coupled | Decoupled | 1.13 | 1.29 (R2*R3*RCVT) |
| | Coupled | Decoupled | 1.25 | 1.42 (R2*R3*RCVT) |
| | Coupled | Decoupled | 1.37 | 1.56 (R2*R3*RCVT) |
| | Decoupled | Coupled | 1.06 | 1.71 (R1*R4*RCVT) |
| | Decoupled | Coupled | 1.16 | 1.87 (R1*R4*RCVT) |

TABLE 3-continued

| C1 | C2 | RCVT | System transmission ratio |
|---|---|---|---|
| Decoupled | Coupled | 1.29 | 2.07 (R1*R4*RCVT) |
| Decoupled | Coupled | 1.42 | 2.28 (R1*R4*RCVT) |
| Coupled | Coupled | 1.09 | 2.51 (R2*R4*RCVT) |
| Coupled | Coupled | 1.20 | 2.76 (R2*R4*RCVT) |
| Coupled | Coupled | 1.33 | 3.04 (R2*R4*RCVT) |
| Coupled | Coupled | 1.45 | 3.34 (R2*R4*RCVT) |

In the example of table 3, each consecutive shift changes the system transmission ratio with, approximately, 10%. The transmission ratios of the CVT 403 (RCVT) can be preprogrammed. The CVT can accordingly by controlled to switch from one preprogrammed transmission ratio to another.

Table 4 shows another example of system transmission ratios that are obtainable by a transmission system 1 as shown in FIG. 2A. This example shows a 16-speed transmission system 1, with a constant transmission step size of about 1.12.

TABLE 4

| | C1 | C2 | RCVT | System transmission ratio |
|---|---|---|---|---|
| R1 = 1.11 | Decoupled | Decoupled | 1.00 | 0.60 (R1*R3*RCVT) |
| R2 = 1.73 | Decoupled | Decoupled | 1.12 | 0.67 (R1*R3*RCVT) |
| R3 = 0.55 | Decoupled | Decoupled | 1.25 | 0.75 (R1*R3*RCVT) |
| R4 = 1.35 | Decoupled | Decoupled | 1.40 | 0.84 (R1*R3*RCVT) |
| | Coupled | Decoupled | 1.00 | 0.94 (R2*R3*RCVT) |
| | Coupled | Decoupled | 1.12 | 1.06 (R2*R3*RCVT) |
| | Coupled | Decoupled | 1.25 | 1.18 (R2*R3*RCVT) |
| | Coupled | Decoupled | 1.40 | 1.33 (R2*R3*RCVT) |
| | Decoupled | Coupled | 1.00 | 1.49 (R1*R4*RCVT) |
| | Decoupled | Coupled | 1.12 | 1.66 (R1*R4*RCVT) |
| | Decoupled | Coupled | 1.25 | 1.86 (R1*R4*RCVT) |
| | Decoupled | Coupled | 1.40 | 2.09 (R1*R4*RCVT) |
| | Coupled | Coupled | 1.00 | 2.34 (R2*R4*RCVT) |
| | Coupled | Coupled | 1.12 | 2.62 (R2*R4*RCVT) |
| | Coupled | Coupled | 1.25 | 3.93 (R2*R4*RCVT) |
| | Coupled | Coupled | 1.40 | 3.28 (R2*R4*RCVT) |

In the example of table 4, each consecutive shift changes the system transmission ratio with, approximately, 12%. The transmission ratios of the CVT 403 (RCVT) can be preprogrammed. In this example, the CVT 403 only is preprogrammed to be operable according to four different transmission ratios. The CVT can be controlled to switch from one preprogrammed transmission ratio to another.

In this example of table 4, the first transmission ratio, here R1=1.11, is obtained by a meshing 63-teeth primary gear 100A1 and a 57-teeth secondary gear 100A2; the second transmission ratio, here R2=1.73, is obtained by a meshing 76-teeth primary gear 100B1 and a 44-teeth secondary gear 100B2; the third transmission ratio, here R3-0.55, is obtained by a meshing 78-teeth primary gear 200A1 and a 42-teeth secondary gear 200A2; and the fourth transmission ratio, here R4=1.35, is obtained by a meshing 51-teeth primary gear 200B1 and a 69-teeth secondary gear 200B2. These gear pairs are such that all summed number of teeth for each meshing gear pair are equal. In this case the summed number of teeth for each meshing gear pair is 120 teeth. The gear pairs are particularly such that a sum of radii of each primary-secondary gear pair is the same for all gear pairs. Hence, the primary gears can be arranged to rotate about a common primary axis, here defined by the coaxial input I and output O shaft, and the secondary gears can be arranged to rotate about a common secondary axis, here defined by the intermediate shaft 400, parallel to the primary axis, while each pair of gears can be permanently meshingly engaged. The clutches C1 and C2 can accordingly be used to select a desired gear pair for transferring torque, and hence a desired transmission ratio, without having to displace gears. This exemplary first, second, third, and fourth transmission ratios and associated gear teething is summarized in table 5. Other examples are given in tables 6-9.

TABLE 5

| (Gear centre distance: e.g. 60 mm) | | | | |
|---|---|---|---|---|
| | Primary gear | Secondary gear | Sum | Ratio |
| R1 | 63 teeth | 57 teeth | 120 teeth | 1.11 |
| R2 | 76 teeth | 44 teeth | 120 teeth | 1.73 |
| R3 | 78 teeth | 42 teeth | 120 teeth | 0.54 |
| R4 | 51 teeth | 69 teeth | 120 teeth | 1.35 |

TABLE 6

| (Gear centre distance: e.g. 58 mm) | | | | |
|---|---|---|---|---|
| | Primary gear | Secondary gear | Sum | Ratio |
| R1 | 52 teeth | 64 teeth | 116 teeth | 0.81 |
| R2 | 65 teeth | 51 teeth | 116 teeth | 1.27 |
| R3 | 71 teeth | 45 teeth | 116 teeth | 0.63 |
| R4 | 46 teeth | 70 teeth | 116 teeth | 1.52 |

TABLE 7

| (Gear centre distance: e.g. 58 mm) | | | | |
|---|---|---|---|---|
| | Primary gear | Secondary gear | Sum | Ratio |
| R1 | 52 teeth | 64 teeth | 116 teeth | 0.81 |
| R2 | 62 teeth | 54 teeth | 116 teeth | 1.15 |
| R3 | 66 teeth | 50 teeth | 116 teeth | 0.76 |
| R4 | 46 teeth | 70 teeth | 116 teeth | 1.52 |

TABLE 8

| (Gear centre distance: e.g. 58 mm) | | | | |
|---|---|---|---|---|
| | Primary gear | Secondary gear | Sum | Ratio |
| R1 | 52 teeth | 64 teeth | 116 teeth | 0.81 |
| R2 | 57 teeth | 59 teeth | 116 teeth | 0.97 |
| R3 | 66 teeth | 50 teeth | 116 teeth | 0.76 |
| R4 | 46 teeth | 70 teeth | 116 teeth | 1.52 |

TABLE 9

| (Gear centre distance: e.g. 58 mm) | | | | |
|---|---|---|---|---|
| | Primary gear | Secondary gear | Sum | Ratio |
| R1 | 55 teeth | 61 teeth | 116 teeth | 0.90 |
| R2 | 68 teeth | 48 teeth | 116 teeth | 1.42 |
| R3 | 71 teeth | 45 teeth | 116 teeth | 0.63 |
| R4 | 46 teeth | 70 teeth | 116 teeth | 1.52 |

The examples of tables 1-4 show a relation between the system transmission ratios having a, substantially, constant transmission ratio step between consecutive system transmission ratios. It will be appreciated that any relation can also be obtained using the CVT 403, e.g. progressively increasing and/or decreasing transmission ratio steps between consecutive system transmission ratios. The CVT 403 can be operated accordingly, e.g. using a control unit.

Table 10 shows another example of system transmission ratios obtainable by a transmission system as shown in FIGS. 1A, 1B, 2A. This example includes transmission ratios R1, R2, R3, R4, corresponding to the example of table 10. The CVT 403 is preprogrammed to operate according to various transmission ratios RCVT, within a continuous range of transmission ratios.

TABLE 10

| | C1 | C2 | RCVT | System transmission ratio |
|---|---|---|---|---|
| R1 = 0.71 | Decoupled | Decoupled | 1.00 | 0.71 (R1*R3*RCVT) |
| R2 = 1.00 | Decoupled | Decoupled | 1.07 | 0.76 (R1*R3*RCVT) |
| R3 = 1.00 | Decoupled | Decoupled | 1.15 | 0.82 (R1*R3*RCVT) |
| R4 = 2.00 | Decoupled | Decoupled | 1.23 | 0.87 (R1*R3*RCVT) |
| | Decoupled | Decoupled | 1.32 | 0.94 (R1*R3*RCVT) |
| | Coupled | Decoupled | 1.00 | 1.00 (R2*R3*RCVT) |
| | Coupled | Decoupled | 1.07 | 1.07 (R2*R3*RCVT) |
| | Coupled | Decoupled | 1.15 | 1.15 (R2*R3*RCVT) |
| | Coupled | Decoupled | 1.23 | 1.23 (R2*R3*RCVT) |
| | Coupled | Decoupled | 1.32 | 1.32 (R2*R3*RCVT) |
| | Decoupled | Coupled | 1.00 | 1.42 (R1*R4*RCVT) |
| | Decoupled | Coupled | 1.07 | 1.52 (R1*R4*RCVT) |
| | Decoupled | Coupled | 1.15 | 1.63 (R1*R4*RCVT) |
| | Decoupled | Coupled | 1.23 | 1.75 (R1*R4*RCVT) |
| | Decoupled | Coupled | 1.32 | 1.88 (R1*R4*RCVT) |
| | Coupled | Coupled | 1.00 | 2.00 (R2*R4*RCVT) |
| | Coupled | Coupled | 1.07 | 2.14 (R2*R4*RCVT) |
| | Coupled | Coupled | 1.15 | 2.30 (R2*R4*RCVT) |
| | Coupled | Coupled | 1.23 | 2.46 (R2*R4*RCVT) |
| | Coupled | Coupled | 1.32 | 2.64 (R2*R4*RCVT) |
| | Coupled | Coupled | 1.42 | 2.83 (R2*R4*RCVT) |

The CVT 403 provides intermediate transmission ratio steps, between the system transmission ratios obtainable with only the first and second transmissions 100, 200. Hence, the first and second transmission 100, 200 combined can provide a spread of system transmission ratios, while the CVT 403 can be used to provide appropriate, intermediate, steps between consecutive ratios. The CVT 403 can also be used to extend the range of system transmission ratios provided by the first and second transmissions 100, 200.

Here, the consecutive system transmission steps are constant, here of 7%, providing a linear set of, here twenty-one, system transmission ratios. It will be appreciated that non-linear sets may also be obtained by programming the CVT transmission ratios RCVT accordingly. For example, a progressively increasing or decreasing transmission steps may be obtained. The steps may even be changed on-the-fly, i.e. during operation of the transmission, e.g. by properly selecting or re-programming of the CVT transmission ratios RCVT.

In this example, the transmission ratios are chosen such that the number of different CVT transmission ratios RCVT is less than the number of system transmission ratios. The number of different CVT transmission ratios RCVT is particularly less than half the number of system transmission ratios, more particularly about 25% of the number of system transmission ratios. The CVT 403 is, here, operated according to five different transmission ratios, particularly 1.00, 1.07, 1.15, 1.23 and 1.32, wherein an additional CVT transmission ratio of 1.42 is provided for extending the range provided by the first and second transmissions 100, 200.

Tables 11-13 provide other examples of sets of system transmission ratios obtainable by a transmission system as shown in FIGS. 1A, 1B, 2A, wherein the transmission ratios R1, R2, R3, R4, again correspond to the example of table 10. Compared to table 10, instead of a 21-speed transmission system, tables 11-13 respectively show a 17-speed, 13-speed and 9-speed transmission system. The overall range of system transmission ratios are substantially the same between the examples, here about 400%, but compared to table 10, the CVTs 403 provide fewer intermediate steps.

TABLE 17

| | C1 | C2 | RCVT | System transmission ratio |
|---|---|---|---|---|
| R1 = 0.71 | Decoupled | Decoupled | 1.00 | 0.71 (R1*R3*RCVT) |
| R2 = 1.00 | Decoupled | Decoupled | 1.09 | 0.77 (R1*R3*RCVT) |
| R3 = 1.00 | Decoupled | Decoupled | 1.19 | 0.84 (R1*R3*RCVT) |
| R4 = 2.00 | Decoupled | Decoupled | 1.30 | 0.92 (R1*R3*RCVT) |
| | Coupled | Decoupled | 1.00 | 1.00 (R2*R3*RCVT) |
| | Coupled | Decoupled | 1.09 | 1.09 (R2*R3*RCVT) |
| | Coupled | Decoupled | 1.19 | 1.19 (R2*R3*RCVT) |
| | Coupled | Decoupled | 1.30 | 1.30 (R2*R3*RCVT) |
| | Decoupled | Coupled | 1.00 | 1.41 (R1*R4*RCVT) |
| | Decoupled | Coupled | 1.09 | 1.54 (R1*R4*RCVT) |
| | Decoupled | Coupled | 1.19 | 1.68 (R1*R4*RCVT) |
| | Decoupled | Coupled | 1.30 | 1.83 (R1*R4*RCVT) |
| | Coupled | Coupled | 1.00 | 2.00 (R2*R4*RCVT) |
| | Coupled | Coupled | 1.09 | 2.18 (R2*R4*RCVT) |
| | Coupled | Coupled | 1.19 | 2.38 (R2*R4*RCVT) |
| | Coupled | Coupled | 1.30 | 2.59 (R2*R4*RCVT) |
| | Coupled | Coupled | 1.41 | 2.82 (R2*R4*RCVT) |

TABLE 18

| | C1 | C2 | RCVT | System transmission ratio |
|---|---|---|---|---|
| R1 = 0.71 | Decoupled | Decoupled | 1.00 | 0.71 (R1*R3*RCVT) |
| R2 = 1.00 | Decoupled | Decoupled | 1.12 | 0.80 (R1*R3*RCVT) |
| R3 = 1.00 | Decoupled | Decoupled | 1.25 | 0.89 (R1*R3*RCVT) |
| R4 = 2.00 | Coupled | Decoupled | 1.00 | 1.00 (R2*R3*RCVT) |
| | Coupled | Decoupled | 1.12 | 1.12 (R2*R3*RCVT) |
| | Coupled | Decoupled | 1.25 | 1.25 (R2*R3*RCVT) |
| | Decoupled | Coupled | 1.00 | 1.42 (R1*R4*RCVT) |
| | Decoupled | Coupled | 1.12 | 1.59 (R1*R4*RCVT) |
| | Decoupled | Coupled | 1.25 | 1.78 (R1*R4*RCVT) |
| | Coupled | Coupled | 1.00 | 2.00 (R2*R4*RCVT) |
| | Coupled | Coupled | 1.12 | 2.24 (R2*R4*RCVT) |
| | Coupled | Coupled | 1.25 | 2.51 (R2*R4*RCVT) |
| | Coupled | Coupled | 1.40 | 2.81 (R2*R4*RCVT) |

TABLE 19

| | C1 | C2 | RCVT | System transmission ratio |
|---|---|---|---|---|
| R1 = 0.71 | Decoupled | Decoupled | 1.00 | 0.71 (R1*R3*RCVT) |
| R2 = 1.00 | Decoupled | Decoupled | 1.19 | 0.84 (R1*R3*RCVT) |
| R3 = 1.00 | Coupled | Decoupled | 1.00 | 1.00 (R2*R3*RCVT) |
| R4 = 2.00 | Coupled | Decoupled | 1.19 | 1.19 (R2*R3*RCVT) |
| | Decoupled | Coupled | 1.00 | 1.42 (R1*R4*RCVT) |
| | Decoupled | Coupled | 1.19 | 1.68 (R1*R4*RCVT) |
| | Coupled | Coupled | 1.00 | 2.00 (R2*R4*RCVT) |
| | Coupled | Coupled | 1.19 | 2.37 (R2*R4*RCVT) |
| | Coupled | Coupled | 1.40 | 2.81 (R2*R4*RCVT) |

FIG. 2B shows an exemplary schematic layout of the transmission system 1 as shown in FIG. 2A. In the example of FIG. 2B, the input shaft and the output shaft are coaxially arranged with respect to one another, but it will be appreciated that an offset arrangement, in which the input shaft and the output shaft are offset with respect to one another, can also be provided. It will further be appreciated that the CVT 403 and/or the input I and/or the output O can be coaxially arranged. Here the CVT 403, being associated with an intermediate axis 406, is provided offset from the input and output shafts, to obtain a particular compact setup. The first transmission output 102 and the CVT input 404 are connected to one another. The CVT output 405 and the second transmission input 201 are also connected to one another. A continuously variable transmission ratio may be provided between the CVT input 404 and CVT output 405. The transmission system of FIG. 2B can e.g. be a crank transmission system. The crank transmission system can be included in a housing at the crank of a bicycle.

Figure 3A:
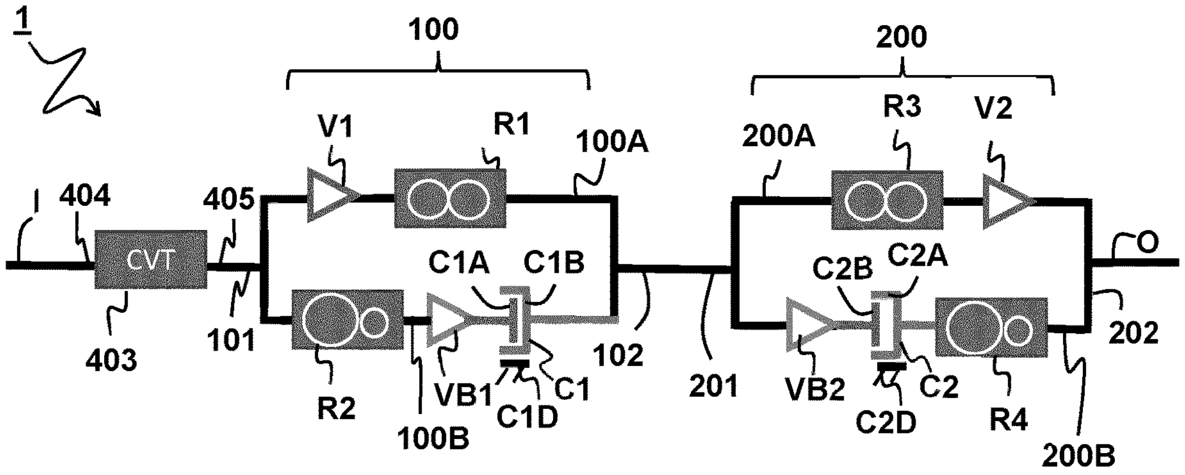
FIGS. 3A-3B show a schematic example of a transmission system.
Figure 11A:
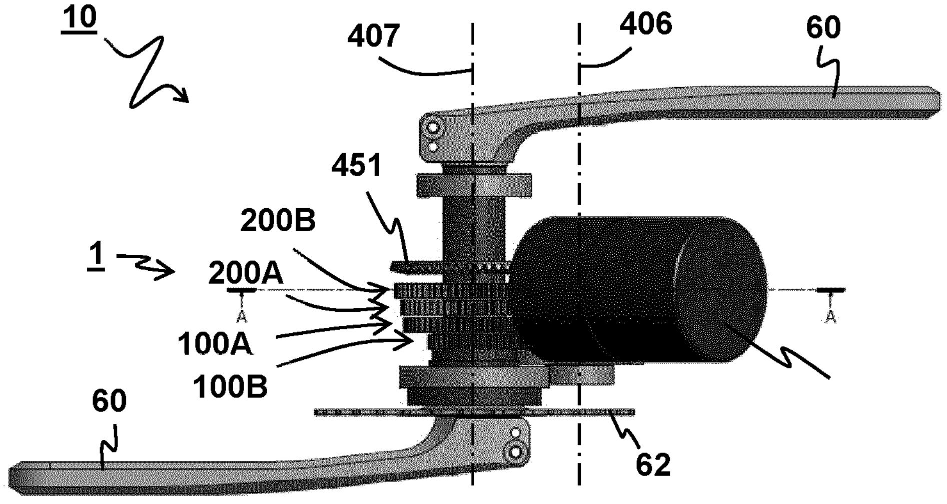
FIGS. 11A-11C show an example of a transmission system for a crank assembly.

FIG. 3A shows another example of a transmission system 1 comprising a continuously variable transmission (CVT) 403 being connected in series with the first transmission 100 and the second transmission 200, similar to the example of FIG. 11A. In this example however, alternative to the example of FIG. 11A, the CVT 403 is arranged at an input side of the first transmission 100, such that the first transmission 100 is arranged between the CVT 403 and the second transmission 200. The first transmission 100 and the second transmission 200 as shown in FIG. 12A are similar to those shown in e.g. FIG. 11A. Also the CVT 403 may be similar as the CVT 403 shown in FIG. 4A, e.g. a ratcheting-type CVT.

Figure 3B:
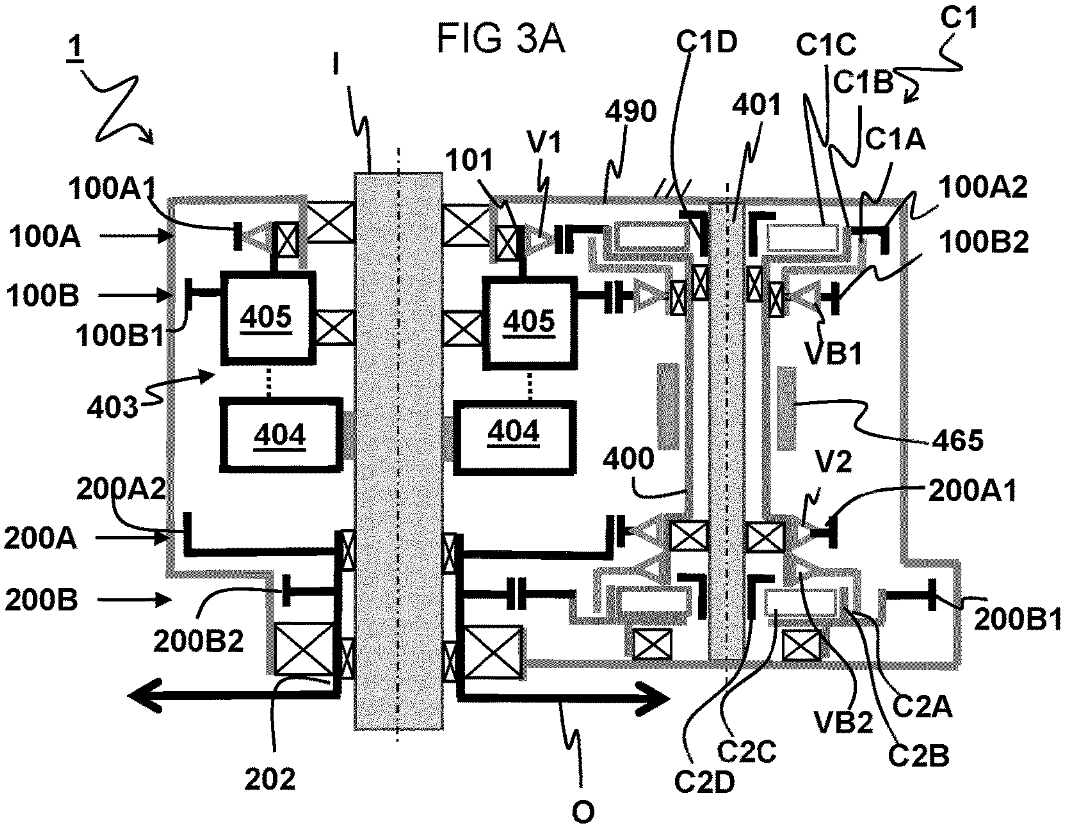

FIG. 3B shows an exemplary schematic layout of the transmission system 1 as shown in FIG. 3A. In this example, alternative to the example shown in FIGS. 2A and 2B, the CVT input 404 is associated with, e.g. connected to, the system input I of the transmission system 1, in this example a rotatable input shaft. The input shaft I may for example be attached to a crank of a bicycle. Hence, the input shaft I may be a crank spindle. The transmission shown in FIG. 3B may, for example, be a crank transmission system. The CVT output 405 is connected to the first input 101 of the first transmission 100. The CVT 403 is arranged to provide a continuously variable transmission ratio, e.g. a set of pre-programmed CVT transmission ratios, between the CVT input 404 and the CVT output 405. In this example, CVT input 404 is fixed to the input shaft, while the CVT output 405 is rotatable relative to the input shaft. The CVT output 405 is connected to the first input 101 of the first transmission 100, and is hereto provided with gear 100A1 for meshing gear 100A2 for forming the first transmission path 100A, and gear 100B1 for meshing with gear 100B2 for forming the second transmission path 100B.

The CVT 403 is in this example coaxially arranged with the input shaft I. The CVT is configured to apply a transmission ratio, e.g. a seventh and eighth transmission ratio between the CVT input 404, here being rotationally fixed to the input shaft I, and the CVT output 405. The first transmission 100 is formed in this example between the CVT output 405 and an intermediate shaft 400. The second transmission 200 is formed between the intermediate shaft 400 and the output shaft O. The intermediate shaft 400 is in this example rotatable relative to a stationary mounting shaft 401. The stationary mounting shaft 401 can for example be mounted to a housing of the transmission system.

In the example of FIG. 3B, the clutches C1 and C2 may for example be clutches as described in WO2018/199757A2, WO2020/085911A2, or WO2021/080431A1. Hence, the clutch C1 has a first rotatable unit C1A connected to the gear 100B1 at the clutch input, and a second rotatable unit C1B connected to the gear 100A2 at the clutch output. The first rotatable unit C1A includes at least one first abutment surface. The second rotatable unit C1B includes at least one second abutment surface arranged for selectively engaging the first abutment surface, the first and second abutment surfaces being adapted to each other so as to allow disengaging under load, preferably in two directions. The clutch C1 further has a third rotatable unit C1C. The third rotatable unit CIC includes at least one retaining member, the third unit C1C being arranged for selectively being in a first mode or a second mode relative to the second unit C1B, wherein the at least one retaining member in the first mode locks the at least one second abutment surface for rotationally coupling the second unit C1B to the first unit C1A, e.g. in two directions, and in the second mode releases the at least one second abutment surface for decoupling the second unit C1B from the first unit C1A. In this example, the clutch C1 comprises a third rotatable unit C1C which includes at least one actuation member arranged for moving the third rotatable unit CIC from a first position to a second position or from a second position to a first position relative to the second rotatable unit C1B. Here, the clutch C1 further comprises a fourth unit C1D including a selector, the selector being arranged for selectively being in a gripping or non-gripping mode; the selector in the gripping mode being arranged for gripping the at least one actuation member for rotating the third rotatable unit C1C from the first position to the second position or from the second position to the first position relative to the second rotatable unit; the selector in the non-gripping mode being arranged for not engaging the at least one actuation member. Similarly, the clutch C2 includes a first rotatable unit C2A connected to the input, a second rotatable unit C2B connected to the output, and a third rotatable unit C2C arranged for co-rotating with the second rotatable unit. The third rotatable unit C2C is arranged for selectively being in a first rotational position or a second rotational position relative to the second rotatable unit. The clutch C2 is arranged for selectively in the first rotational position rotationally coupling the second rotatable unit C2B to the first rotatable unit C2A, and in the second rotational position decoupling the second rotatable unit C2B from the first rotatable unit C2A. The clutch C2 is arranged for temporarily changing rotation speed of the third rotatable unit C2C relative to the second rotatable unit C2A for rotating from the first position to the second position, or from the second position to the first position.

The example of FIG. 3A, 3B also includes an optional torque sensor 465. The torque sensor 465 is arranged to measure a torque transmission through the transmission system 1, specifically between the first transmission 100 and the second transmission 200, which is in this example transmitted by the intermediate shaft 400.

Figure 4A:
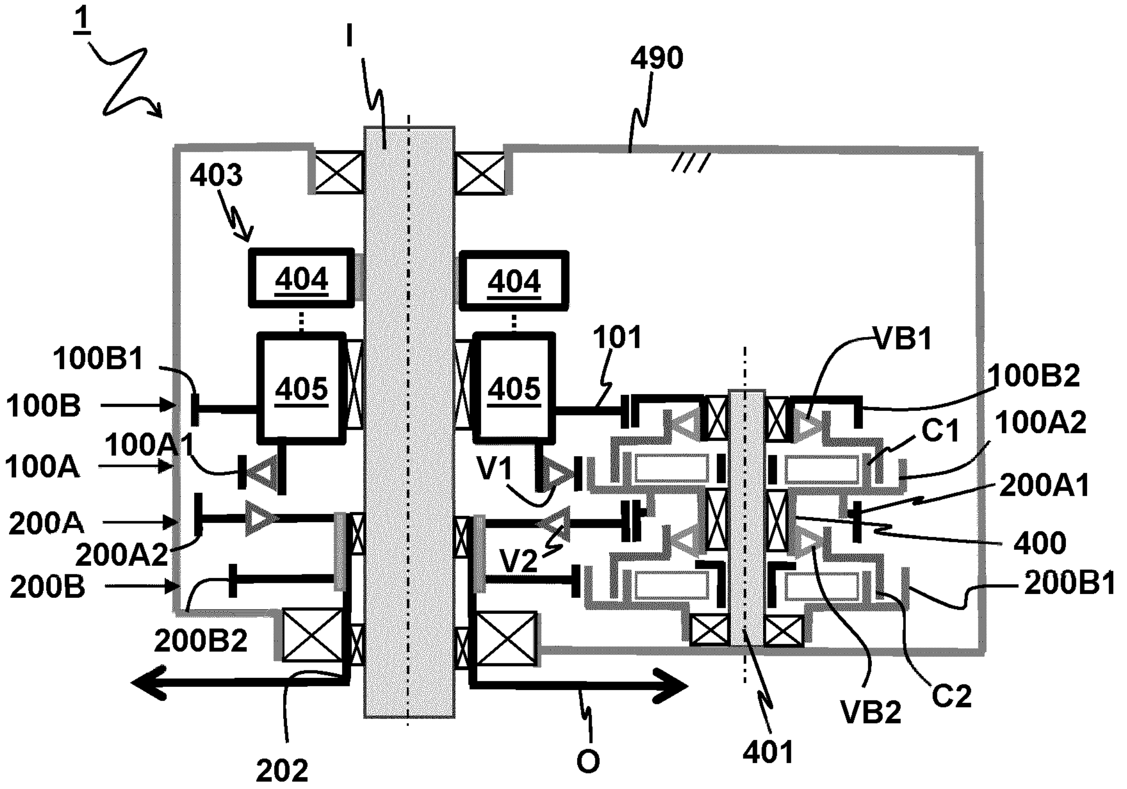
FIGS. 4A-4B show schematic layouts of a transmission system.
Figure 4B:
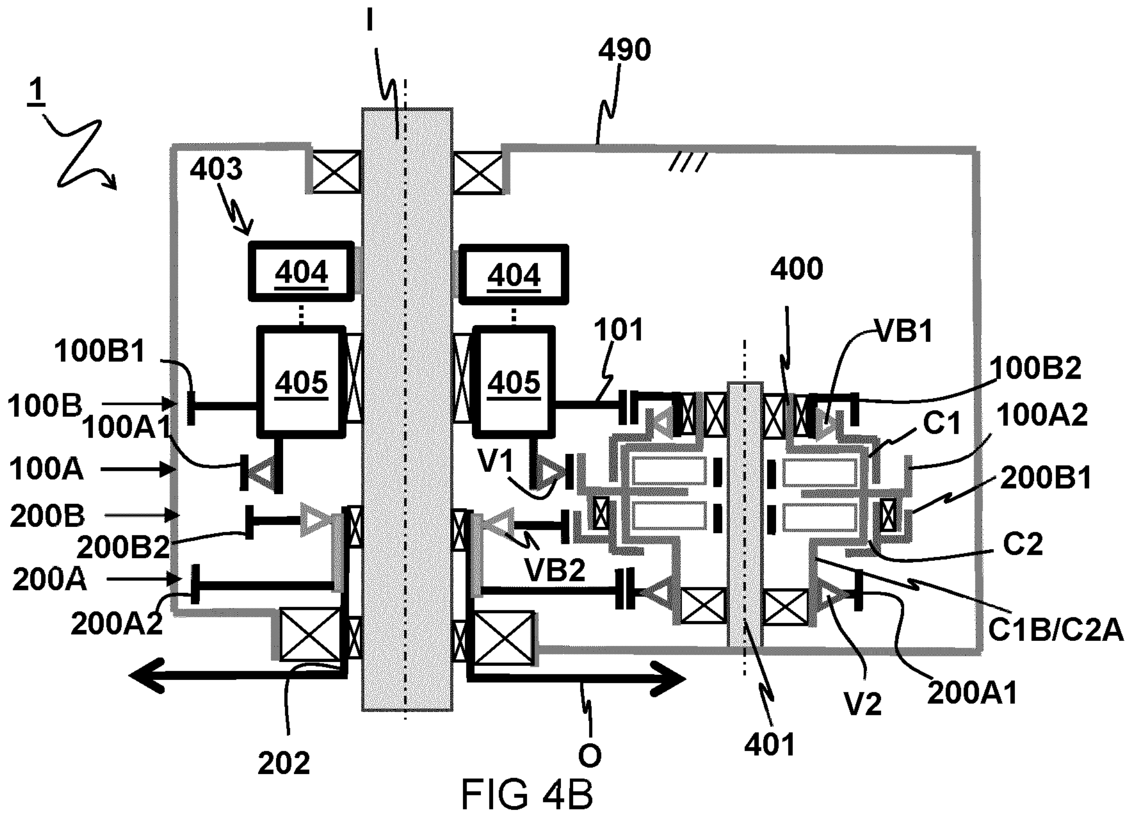

FIGS. 4A, 4B show respective examples of a transmission system. The CVT 403 is in these example arranged between the system input I and the first transmission 100, as is for example schematically shown in FIG. 3A. The CVT 403 is accommodated within the housing 490. The CVT input 404 is mounted to the input shaft I and rotates therewith. The CVT 403 applies a CVT transmission ratio between the CVT input 404 and the CVT output 405. The CVT transmission ratio is selectable from a continuous range of transmission ratios. The CVT 403 can for example be arranged to be operable according to a selective one of a finite set of preselected CVT transmission ratios within the continuous range of transmission ratios. A CVT actuator may be provided for actuating a transmission ratio change of the CVT. The CVT output 405 is rotatable about the input shaft I, relative to the input shaft I. The first input 101 of the first transmission 100 is associated with, or mounted to, the CVT output 405. Gears 100A1 and 100B1 of the first transmission 100 are in this example mounted to, or integrally formed with, the CVT output 405, for meshing with respectively gear 100A2 and gear 100B2, which are associated and rotatable about the mounting shaft 401, to form the first and second transmission ratios of the first transmission 100. Either the first transmission ratio or the second transmission ratio is selected using clutch C1. The second transmission 200 is formed between the mounting shaft 401 and the output shaft O. The third and fourth transmission ratios obtainable with the second transmission 200 are selectable using clutch C2.

Figure 5A:
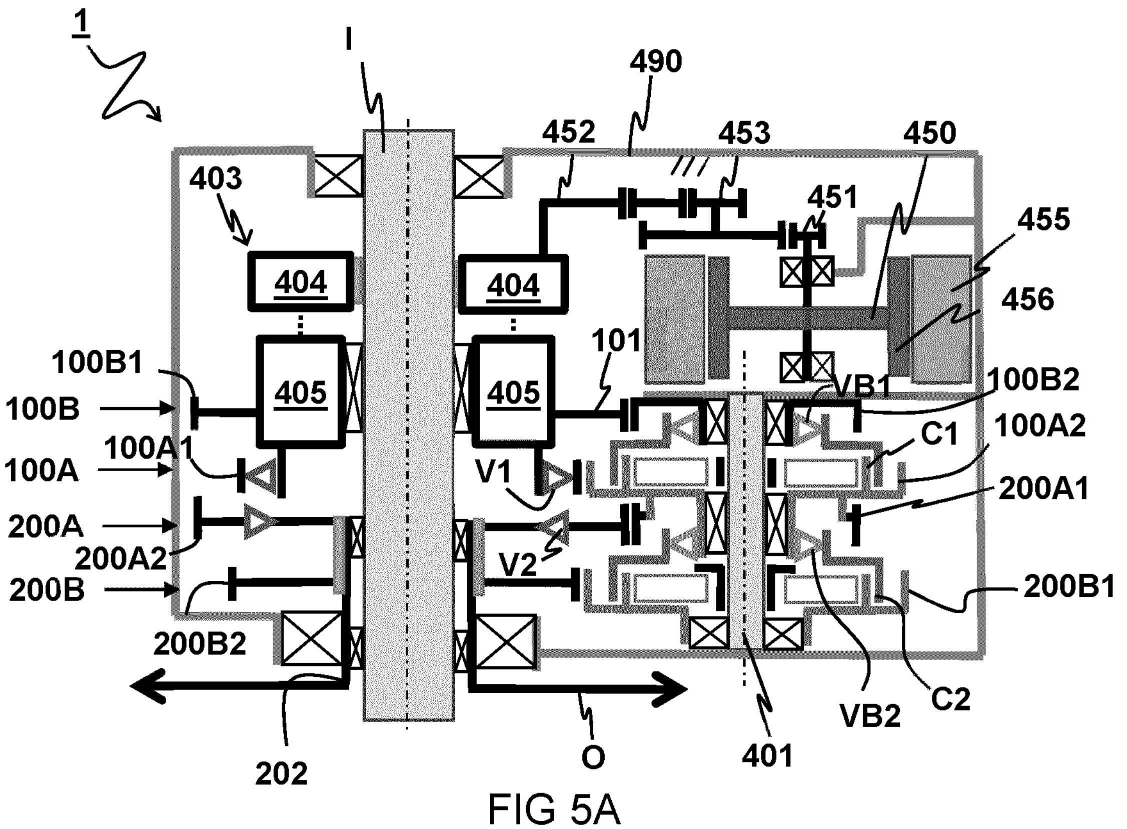
FIGS. 5A-5B show schematic layouts of a transmission system.
Figure 5B:
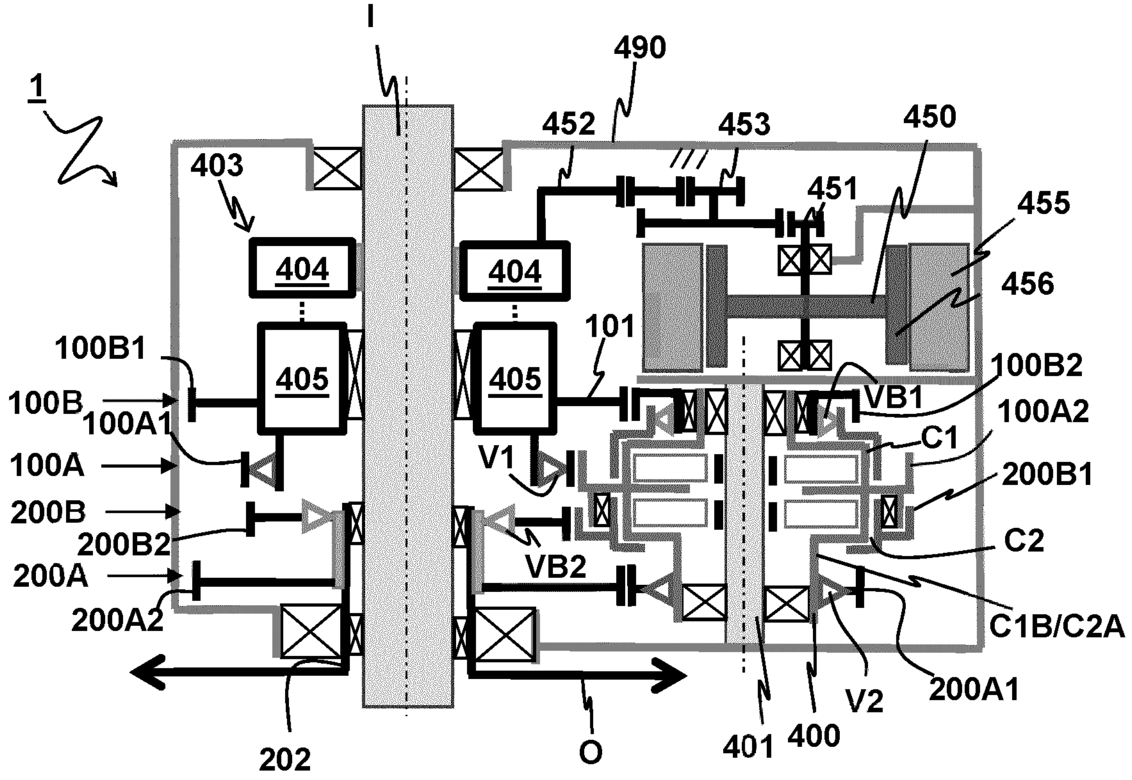

FIGS. 5A, 5B show respective examples of a transmission system similar to the examples shown in FIGS. 4A, 4B further comprising an electric motor 450. The electric motor 450 is here included in the housing 490. The electric motor 450 is in this example coupled, here via reduction gearing 451, 452, 453, to the CVT input 404. The CVT input 404 is in turn coupled to the input shaft I. Hence, the electric motor 450 drives the input shaft I in rotation, via the CVT input 404. The input shaft I can additionally be driven by an additional power source, such as by muscle power of a user transmitted to the input shaft I via a crank.

In the example of FIGS. 4A, 4B and 5A, 5B, the clutches C1 and C2 may for example be clutches as described in WO2018/199757A2, WO2020/085911A2, or WO2021/080431A1, as also set out in view of FIG. 2B.

Figure 6A:
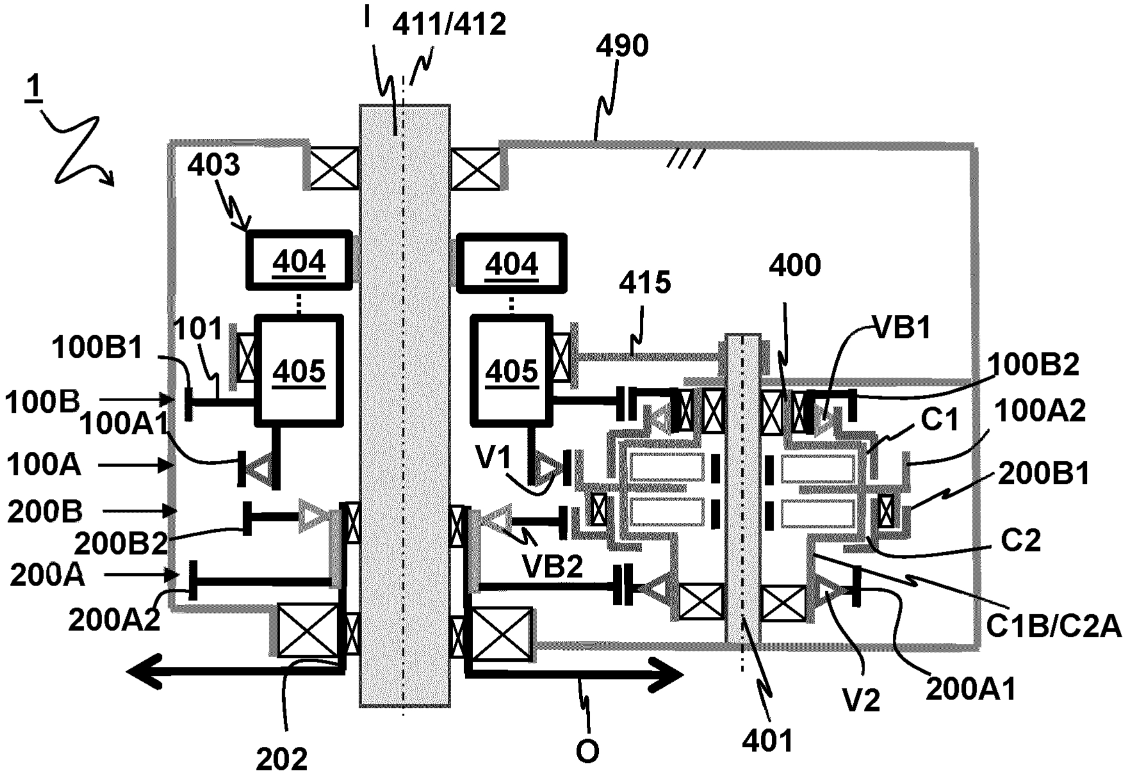
FIGS. 6A-6B show schematic layouts of a transmission system.
Figure 6B:
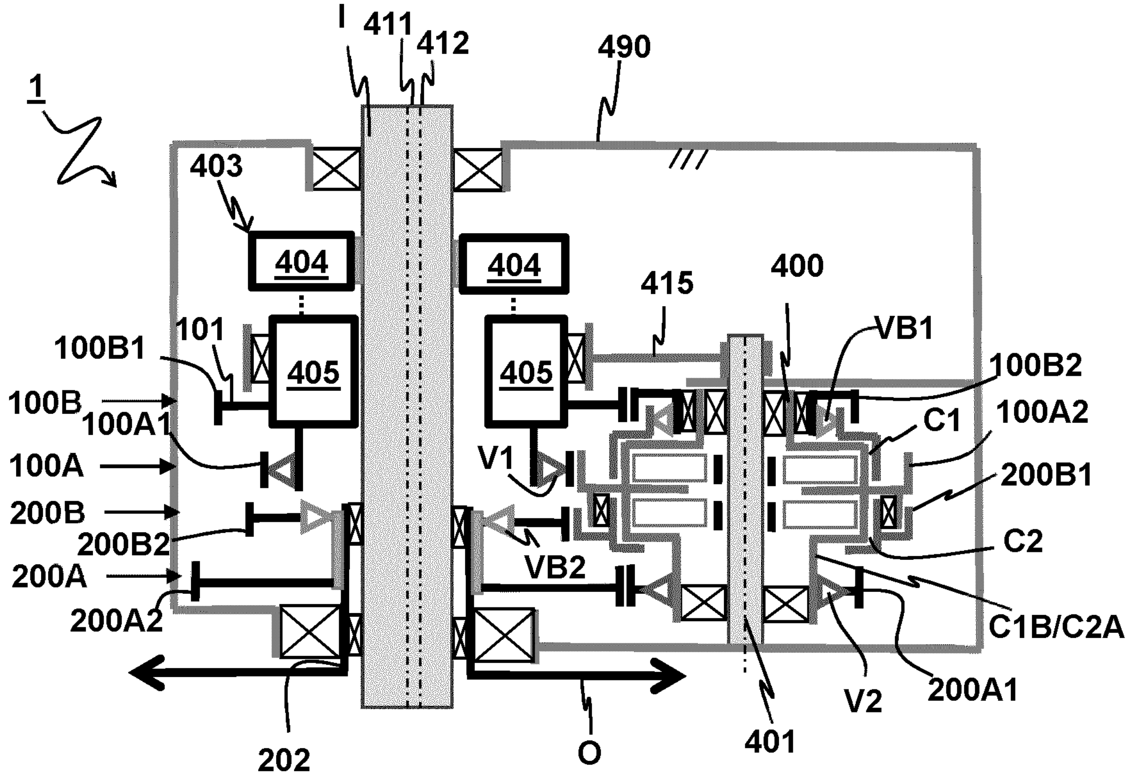

FIGS. 6A, 6B show an example of a transmission system 1, similar to the example shown in FIG. 4B. The CVT input 404 is rotatable about a CVT input axis 411. The CVT input is in this example mounted to the input shaft I, and is hence co-rotates with the input shaft I about the CVT input axis 411. The CVT output 405 is rotatable relative to the CVT input 405 about a CVT output axis 412.

In this example, the CVT output 405 is laterally movable relative to the CVT input 404, in a direction transverse to the CVT input axis 411. Various CVT transmission ratios can be obtained by laterally moving the CVT output 405 relative to the CVT input 404. The CVT input 404 and the CVT output 405 are in this example coupled by coupling elements, arranged for transferring torque from the CVT input 404 to the CVT output 405 at different radii. For example, the coupling elements may be provided at a constant first radius from the CVT input axis and at a variable second radius from the CVT output axis, wherein the second radius is variable by moving the CVT output 405 laterally relative to the CVT input 404, so as to offset the CVT output axis 412 from the CVT input axis 411. An example of such CVT is described in detail in co-pending patent application NL2028686.

FIG. 6A shows the transmission system 1 in a first state, in which the CVT input axis 411 and the CVT output axis 412 coincide. In the first state, the CVT 403 operates according to a 1:1 transmission ratio. FIG. 6B shows the transmission system 1 in a second, different state, in which the CVT output axis 412 is offset from the CVT input axis 411. The transmission system is transitioned from the first state to the second state by moving the CVT output 405 relative to the CVT input 404 in a direction transverse to the CVT input axis 411.

In this example, the CVT output 405 is pivotably drivable about a parallel axis; parallel to the CVT input axis 411. In this particular example, the CVT output 405 is pivotably coupled to the stationary mounting shaft 401, by a pivot arm 415. The pivot arm extends here between the mounting shaft 401 and the CVT output 405. The CVT output 405 is pivotably drivable at a constant radius from the mounting shaft 401; the constant radius being defined by the pivot arm 415. The primary gears 100A1 and 100B1 of the first transmission 100 are in this example mounted to the CVT output 405 and are hence also pivotable along with the CVT output 405 about the mounting shaft 401. Because the secondary gears 100A2 and 100B2 of the first transmission are rotatingly associated with the mounting shaft 401, the primary-secondary gear pairs 100A1-100A2 and 100B1-100B2 can remain meshingly engaged while the CVT output 405 is being pivoted about the mounting shaft 401.

A CVT shift actuator may be arranged for pivoting the pivot arm about the mounting shaft 401, in turn offsetting the CVT output 405 relative to the CVT input 404. The pivot arm 415 may for example be fixed to the mounting shaft 401, wherein the CVT shift actuator is arranged for rotating the mount shaft 401 about its longitudinal axis.

Figure 7A:
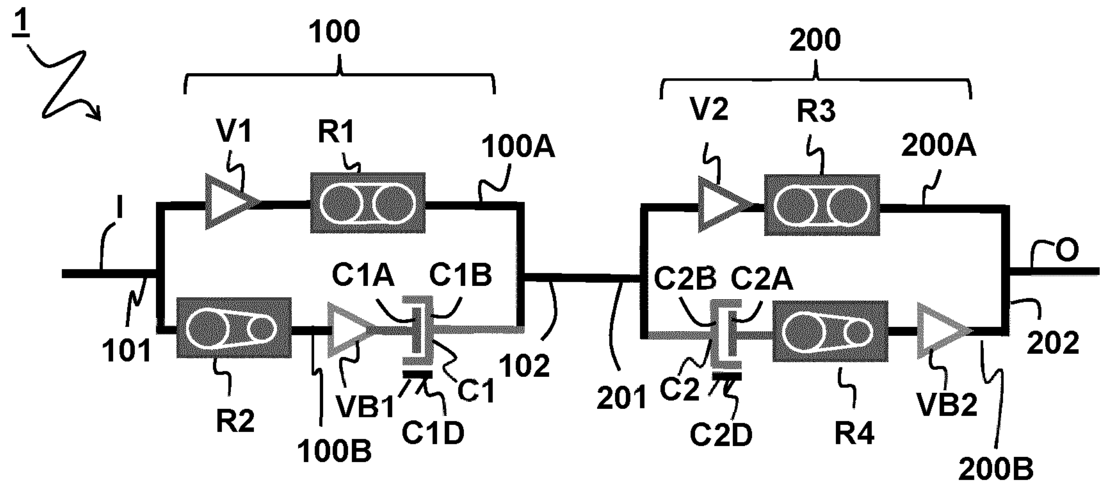
FIGS. 7A-7B show a schematic example of a transmission system.
Figure 7B:
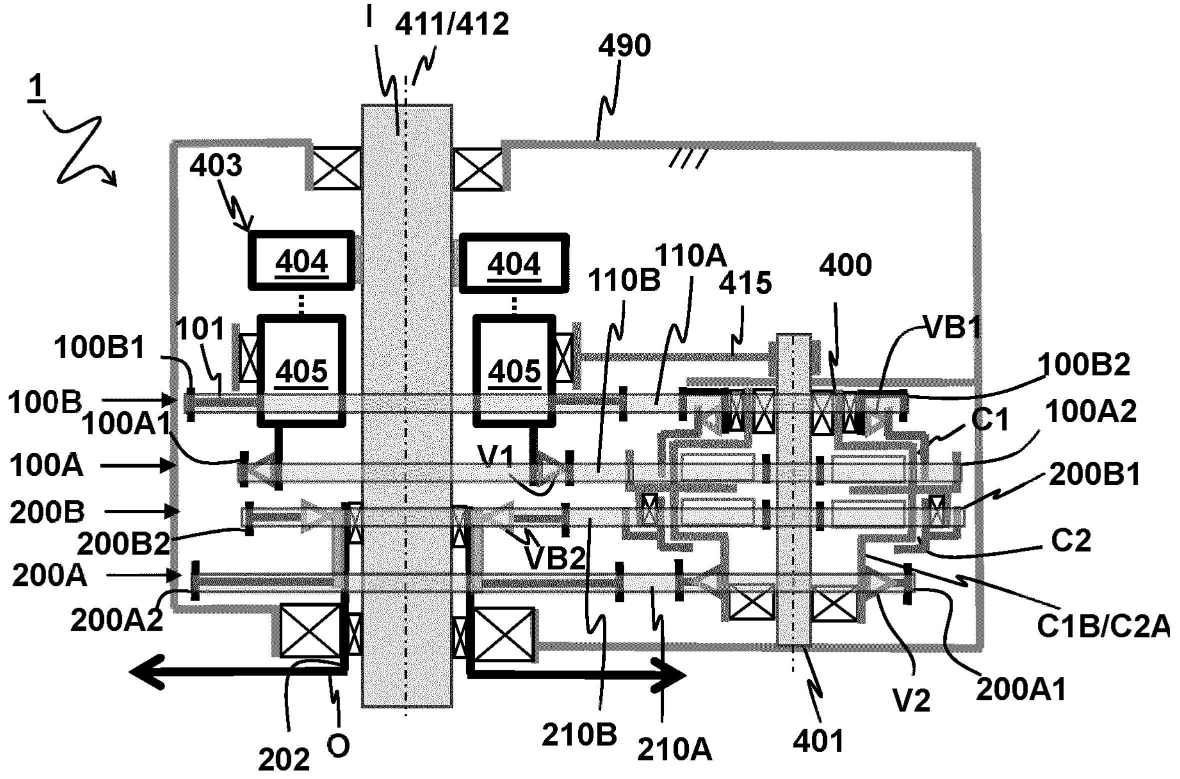

FIGS. 7A, 7B show an example of a gearless transmission system 1. The transmission system 1 in this example is similar to the example shown in FIGS. 6A, 6B, but instead of gear drives for the first and second transmissions 100, 200, the first and second transmissions includes belt drives for transmitting torque. In particular, the first transmission 100 comprises a first endless drive member 110A arranged in the first transmission path 100A, and a second endless drive member 110B arranged in the second transmission path 100B. The first and second endless drive members 110A, 110B, e.g. a first and second belt or chain, connect, respectively, a first and second primary wheel 100A1, 100B1, e.g. a primary chain wheel, with a first and second secondary wheel 100A2, 100B2, e.g. a secondary chain wheel.

In this example, the second transmission 200, similarly, comprises a third endless drive member 210A arranged in the third transmission path 200A, and a fourth endless drive member 210A arranged in the fourth transmission path 200B. The third and fourth endless drive members 210A, 210B, e.g. a third and fourth belt or chain, connect, respectively, a third and fourth primary wheel 200A1, 200B1, e.g. a primary chain wheel, with a third and fourth secondary wheel 200A2, 200B2, e.g. a secondary chain wheel. It will be appreciated that the any of the gear drives of the transmission systems described herein may also be configured as a belt drive.

The exemplary gearless transmission system 1, shown in FIGS. 7A, 7B, does not include meshing gears, and may accordingly be free of oil lubrication. No oil bath is present for lubricating rotational members of the transmission. Standard bearings, e.g. roller bearings, are used instead. There are in this example accordingly no need for oil seals to seal the housing 290. Instead of lubrication oil, a minimal amount of lubrication grease may be applied. The endless drive members and their associated wheels may even be completely free of lubrication.

Figure 8A:
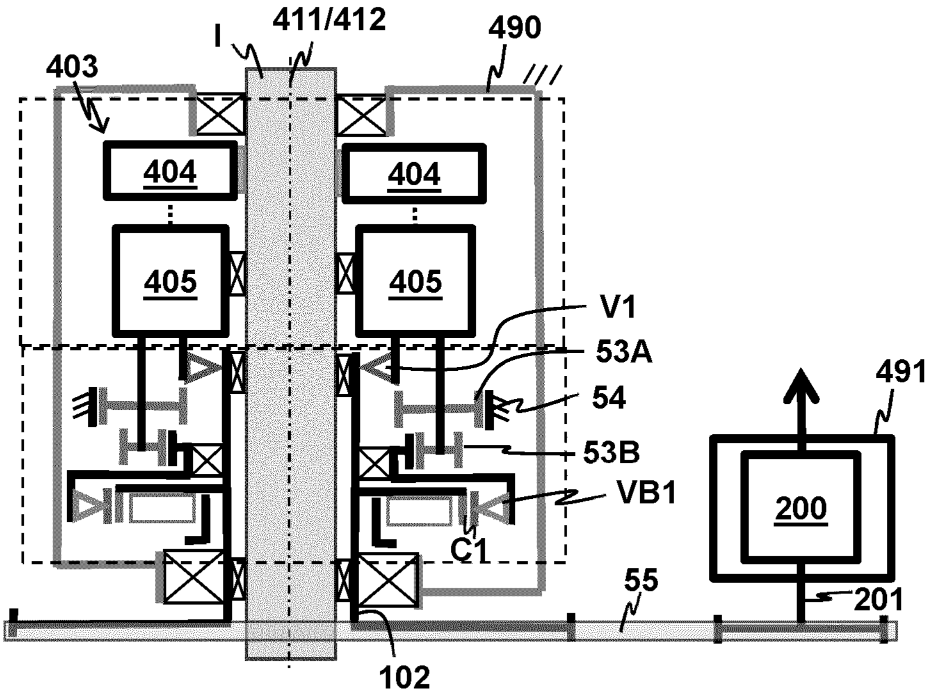
FIGS. 8A-8B show schematic layouts of a transmission system.
Figure 8B:
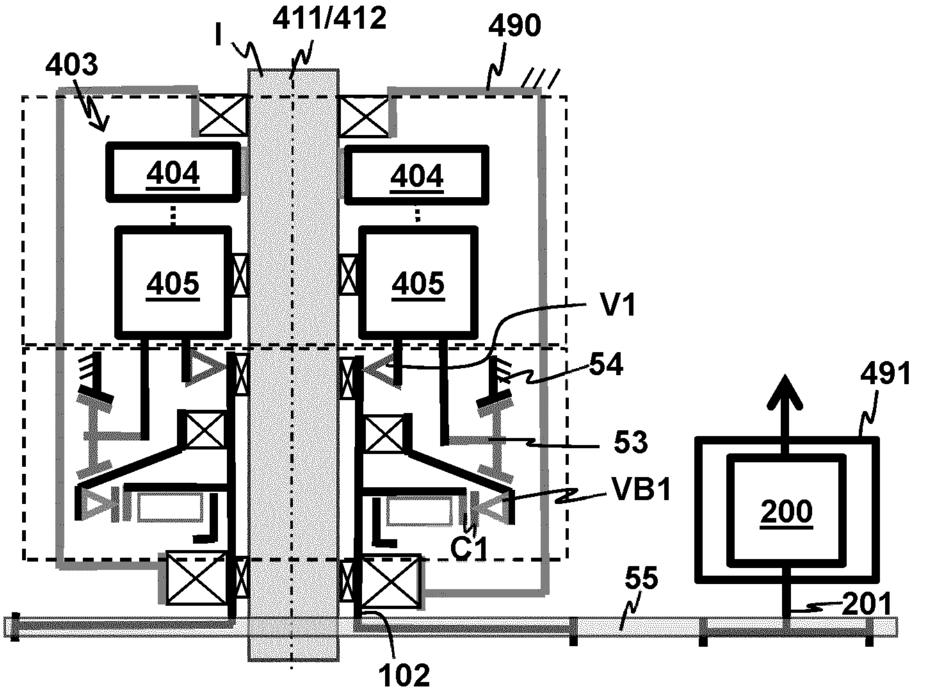

FIGS. 8A-8B show exemplary distributed transmission systems 1, wherein the CVT 403 and the first transmission 100 are held by a first housing 490, here a crank housing 490 as the CVT 403 and the first transmission 100 together here operate as a crank transmission, and the second transmission 200 is held by a second housing, here a hub housing as the second transmission here operate as a hub transmission. The crank transmission system, here comprising the CVT 403 and the first transmission 100, is connected to the hub transmission system, here comprising the second transmission 200, via an endless drive member 55, here a chain. The CVT 403 is connected at an input side of the first transmission 100, wherein, here, the first transmission 100 includes a planetary gear set 50. The planetary gear set is arranged in one of the transmission paths of the first transmission 100, here in the second transmission path 100B. The other transmission path, here the first transmission path 100A, is in this example provides a 1:1 transmission ratio. The first transmission 100 is, here, connected to the second transmission 200 via the endless drive member 55, e.g. a chain or belt, but it will be appreciated the second transmission 200 and the endless drive member 55 may also be omitted. In the exemplary arrangement of FIGS. 8A, 8B, the CVT 403 and the first transmission 100 may be configured to be used as a crank transmission, e.g. between a crank and a front chain wheel of a bicycle, and the second transmission may be configured to be used as a hub transmission, e.g. between a rear sprocket and wheel hub of the bicycle. The endless drive member 55 may for example connect the front chain wheel and the rear sprocket, for transmitting torque from the front chain wheel to the rear sprocket.

In the example of FIG. 8A, the planet gear rotation axes are parallel to the input axis 411, whereas in the example of FIG. 8B the planet gear rotation axes are arranged at an angle, particularly transverse, to the input axis 411.

The planet gears 53 in FIG. 8A are embodied as stepped planet gears. This way, a transmission ratio obtainable with the planetary gear can be increased, compared to arrangement with non-stepped planet gears. Hence, each planet gear 53 includes a large planet member 53A and a small planet member 53B being fixed to each other, and co-rotatable about a respective rotation axis. The large planet member 53A of the stepped planet gear engages the ring gear 54, whereas the small planet member 53B engages the sun gear 51.

The first transmission 100 is selectively operable according to two different transmission ratios R1, R2, wherein, here, R1=1.00 and R2=2.00. R2 is provided by the planetary gear set. With clutch C1, the first transmission 100 can switch between the first transmission path 100A and the second transmission path 100B. Clutch C1 can either be connected at an input of the planetary gear set, or at an output of the planetary gear set.

Torque is transmitted from the CVT input 404 to the CVT output 405. The planet carrier 52 is fixed to the CVT output 205 and corotates therewith about the input shaft I. From the planet carrier 52, torque is transmitted via the stepped planet gears 53 to the sun gear 51, which is couplable to the first transmission output 102 via clutch C1. If clutch C1 is decoupled, however, torque is not transmitted through the planetary gear set, but through the first transmission path 100A which bypasses the planetary gear set. Via the first transmission path 100A, torque is transmitted from CVT output 405 to the first transmission output 102 via freewheel clutch V1. The output 102 of the first transmission 100 may be connected to the input 201 of the second transmission 200, here via an endless drive member 55, e.g. a chain or belt. Another connections are also envisioned.

Figure 9A:
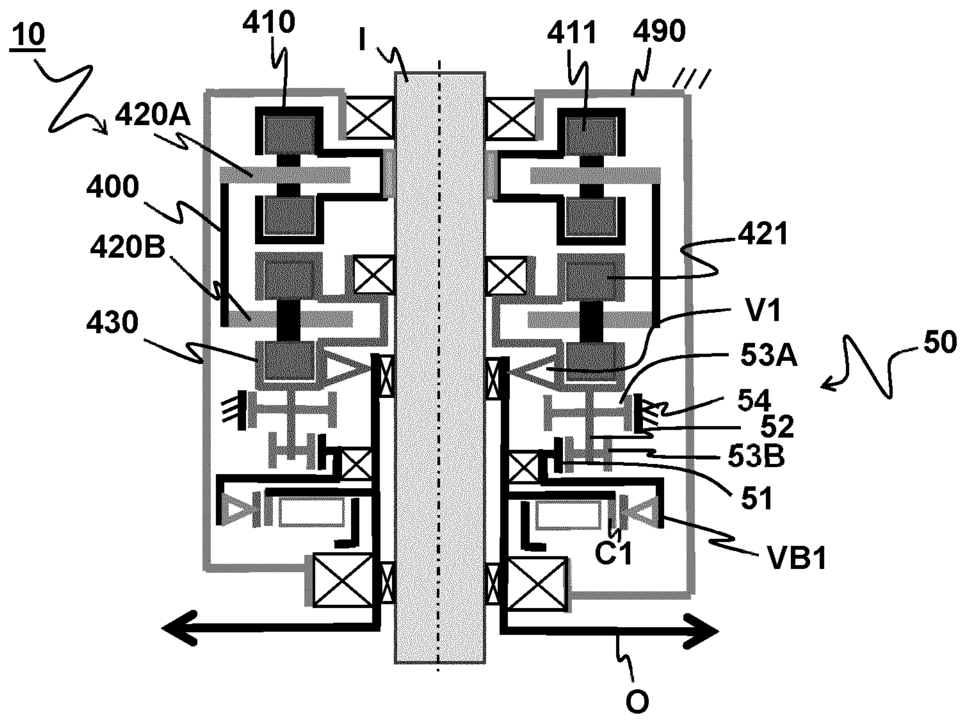
FIGS. 9A-9B show schematic layouts of a transmission system.
Figure 9B:
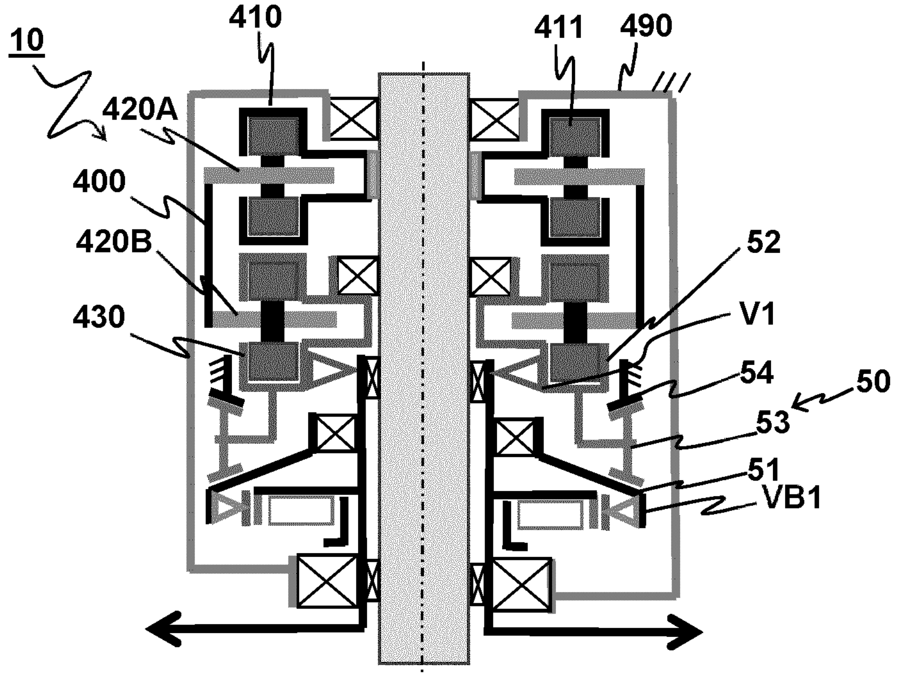

FIGS. 9A and 9B show exemplary transmission systems 10, particularly in accordance with the example of FIGS. 8A and 8B. In FIGS. 9A, 9B an exemplary CVT 403 is shown. Here, the CVT comprises a first drive element 410 that is rotatable about a first axis. Here the first axis coincides with the shaft I. The CVT further comprises a second drive element 420A, 420B, 400 that is rotatable about a second axis parallel to the first axis, wherein the second drive element is movable relative to the first drive element in a direction transverse to the first axis. The CVT comprises first coupling elements 411 for transferring torque between the first drive element 410 and the second drive element 420A, wherein the first coupling elements are provided at a constant first radius from the first axis and at a variable second radius from the second axis. Such CVT is e.g. described in co-pending application NL2028686 incorporated herein by reference in its entirety. In this example, the CVT comprises a third drive element 430 that is rotatable about a third axis parallel to the second axis. Here, the third axis also coincides with the shaft I. The third drive element 430 and the second drive element 420B are movable relative to each other in a direction transverse to the third axis; and second coupling elements 421 provided at a constant third radius from the third axis and at the variable second radius from the second axis, for transferring torque between the third drive element 430 and the second drive element 420B. Such CVT is e.g. described in co-pending application NL2028686 incorporated herein by reference in its entirety. It will be appreciated that such CVT can also be used in the other examples shown herein. It will be appreciated that the CVT of FIG. 7B can be a CVT with the first drive element 410 and the second drive element 420A, but without the third drive element 430.

Figure 10A:
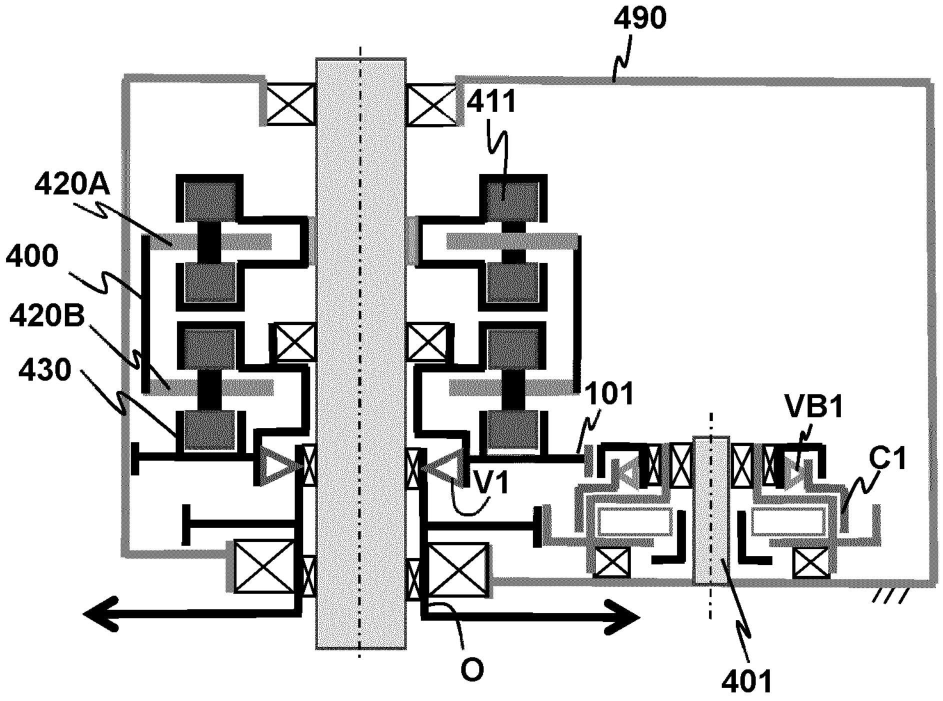
FIGS. 10A-10B show schematic layouts of a transmission system.
Figure 10B:
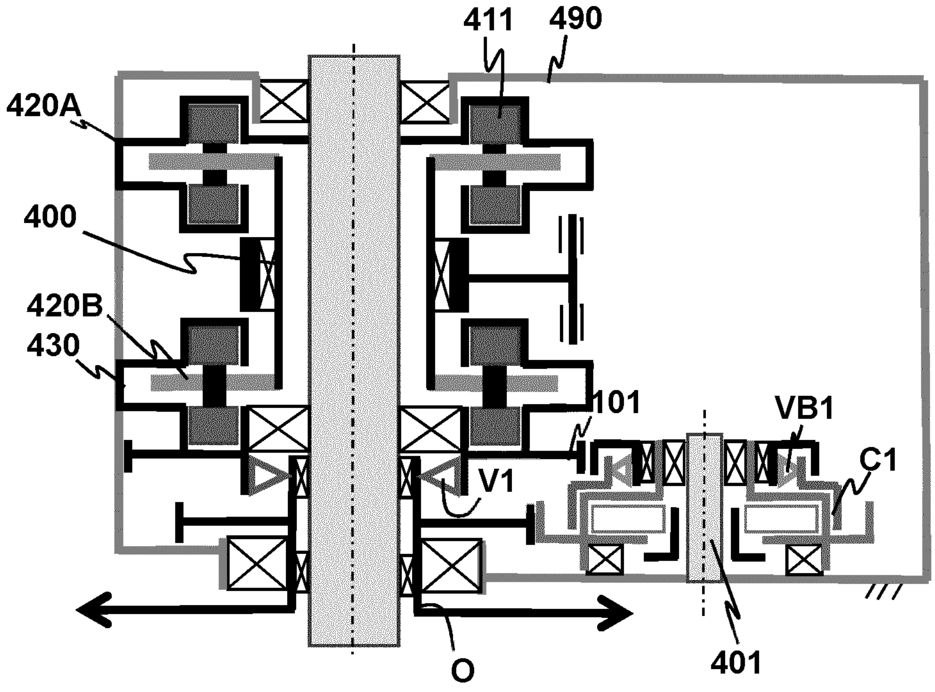

FIGS. 10A and 10B show examples of a transmission system 10, which may be offset alternative configurations to the examples shown in FIGS. 9A-9B. FIGS. 10A and 10B differ from each other in the configuration of the CVT unit 403, in that in FIG. 10A the second drive member parts 420A, 420B are connected at a radius larger than where the coupling elements 411, 421 are present, while in FIG. 10B the second drive member parts 420A, 420B are connected at a radius smaller than where the coupling elements 411, 421 are present.

Similar to the example of FIGS. 9A-9B, one transmission path of the first transmission 100 provides a 1:1 transmission ratio between the third drive element 430 and the output O, and another transmission path provides a non-unity transmission ratio, here a transmission ratio of 2.00. Instead of a coaxially arranged planetary gear set 50 as shown in FIGS. 9A and 9B, the second transmission path 100B extends via an offset intermediate axis, here defined by a stationary mounting shaft 401. Compared to the coaxial arrangement shown in FIGS. 9A, 9B, the examples of FIGS. 10A and 10B are relatively compact in axial direction. On the other hand, the coaxial arrangement of FIGS. 9A-9B is relatively compact in radial direction, compared to the offset arrangement of FIGS. 10A and 10B.

Figure 11B:
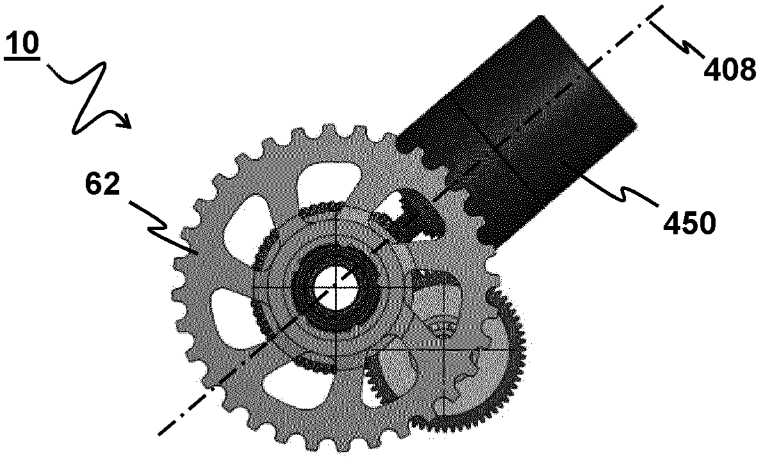
Figure 11C:
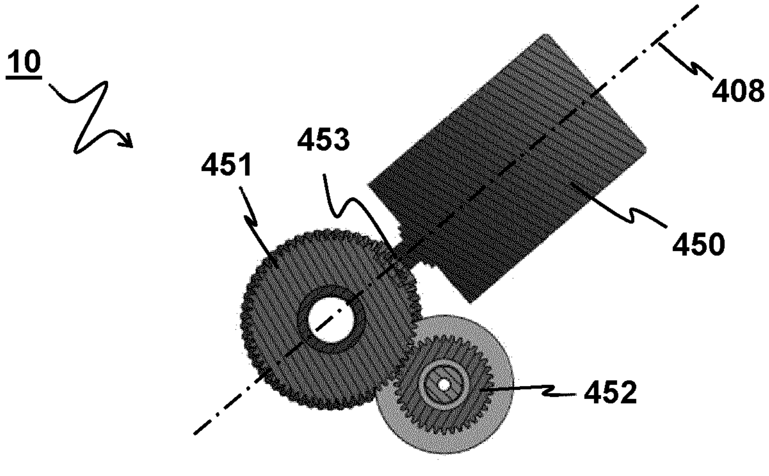

FIGS. 11A-1C show an exemplary implementation of a transmission system 1 as described herein as a crank transmission for a bicycle. FIGS. 11A-11C show particularly a crank assembly 10, wherein the transmission system 1 is provided between a crank 60 of the bicycle and a (front) chain wheel 62. FIG. 11A shows a top view of the crank assembly 10. FIG. 11B shows a side view of the crank assembly 10. FIG. 11C shows a cross-sectional view of the crank assembly 10.

In this example, the crank 60 is connected to, or forms, the system input I and is connected to the front chain wheel via the CVT 403 and the first transmission 100, and optionally via the second transmission 200. The front chain wheel 62 can engage an endless drive member, e.g. a chain or belt. Hence, the transmission system 1 can selectively provide one of various transmission ratios between the crank 60 and the front chain wheel 62.

The crank 60 and the front chain wheel 62 are associated with respectively an input shaft and an output shaft, which are (coaxially) rotatable about a common crank axis 407. The crank 60 and the front chain wheel 62 are connected via an intermediate shaft 400, which can be rotatable about an intermediate axis 406 parallel offset to the crank axis 407.

An electric motor 450, here a brushless DC motor, is arranged for driving the front chain wheel 62 additionally or alternatively to the crank 62. The electric motor 450 can be connectable to any one of the input shaft, intermediate shaft, and output shaft. In this example, the electric motor 450 is connected to the input shaft, here via pinion 453. Here, separate gearing 451, 452 is provided between the electric motor 450 and the intermediate shaft, comprising gear 451 mounted on the input shaft, and gear 452 mounted on the intermediate shaft. Hence, the transmission system can provide different transmission ratios between the electric motor and the front chain wheel 62 and between the crank 60 and the front chain wheel 62. From the intermediate shaft torque inputted by the electric motor 450 is transmitted through a transmission path of the transmission system e.g. through a transmission path of the second transmission.

Here, an output axis 408 of the electric motor 450 extends transverse to the crank axis 407. The electric motor may be accommodated within a bicycle frame, for example in a seat tube or down tube of a bicycle frame. In this example, the output axis 408 extends radially with respect to the crank axis 407, in a direction that corresponds to a direction in which the downtube of a bicycle extends. The electric motor 450 in this example particularly has a cylindrically shaped housing for being accommodated in the down tube. The intermediate shaft is angularly spaced from the electric motor 450 to provide a compact setup.

Figure 12:
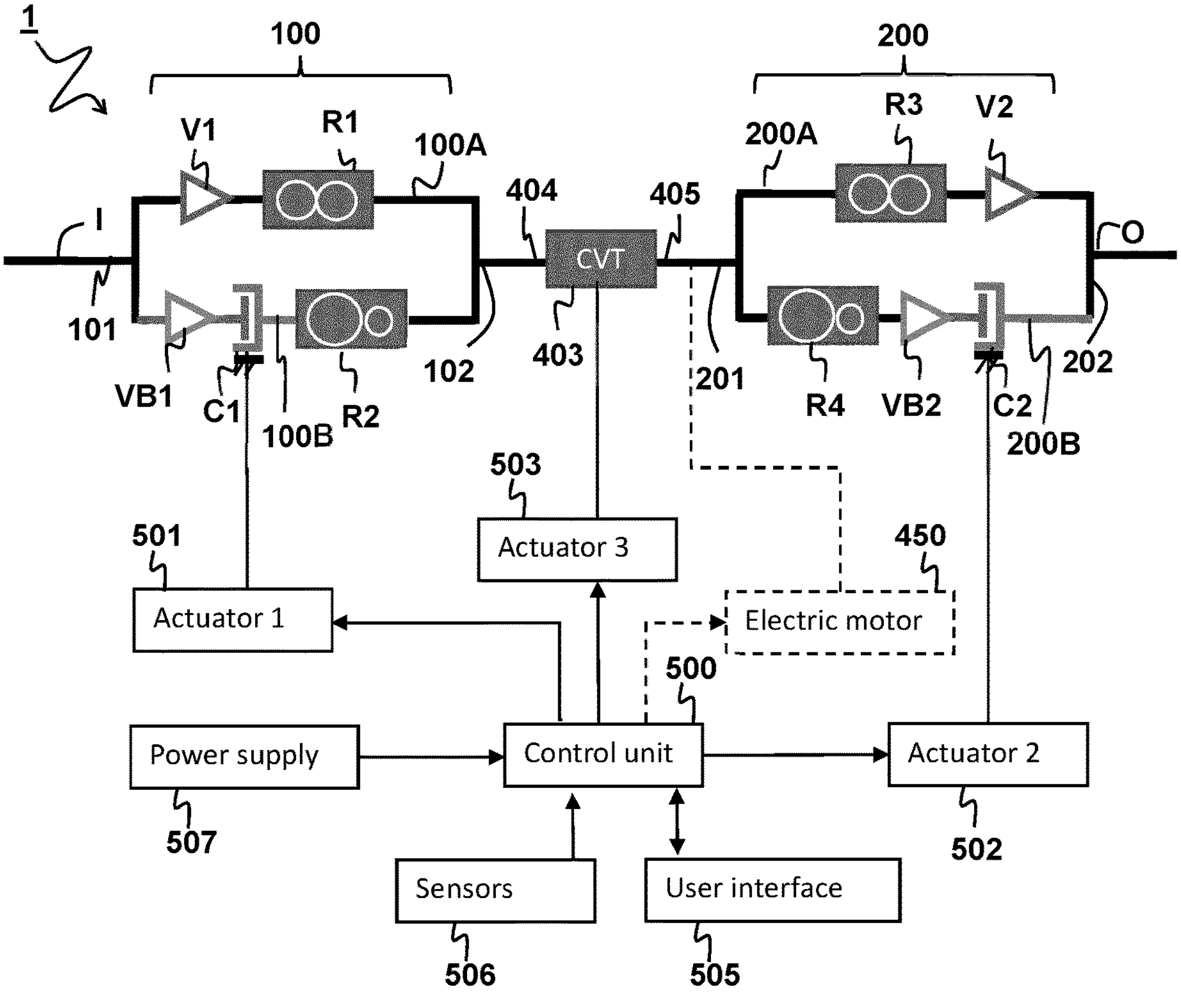
FIG. 12 shows a schematic example of a transmission system.
Figure 13:
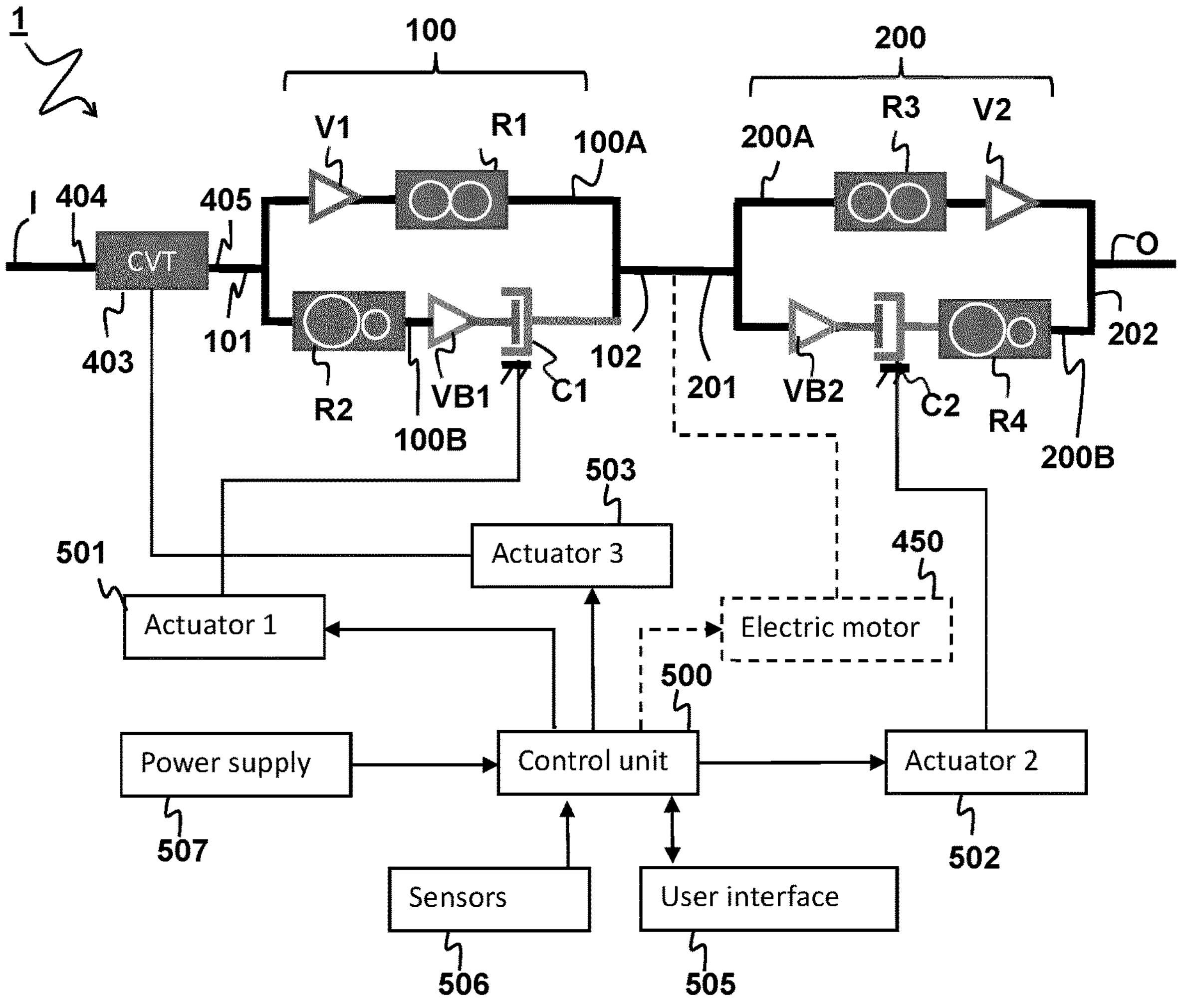
FIG. 13 shows a schematic example of a transmission system.

FIG. 12 shows a transmission system 1, similar to that as shown in FIG. 2A. FIG. 13 shows a transmission system, similar to that as shown in FIG. 3A. Here, the transmission systems 1, as shown in FIGS. 12 and 13, includes a control unit 500. It will be appreciated that each of the examples described herein may include a control unit 500 configured to receive a first shift signal and a second shift signal, and configured to control the first load-shifting clutch and/or the second load-shifting clutch and/or the third load-shifting clutch for selectively coupling or decoupling in response to receiving the first and/or second shift signal. The shift signal may for example be sent, e.g. wirelessly, from a user interface 505, such as from a manual shifter device, e.g. at a handlebar of the bicycle, and/or one or more sensors 506, such as a torque sensor, speed sensor, cadence sensor and/or heart-rate monitor.

The first shift signal can be an upshift signal and the second shift signal can be a downshift signal. The control unit 500 can be configured to selectively control the first and/or second and/or third load-shifting clutch (and optionally the CVT) for selecting the next higher system transmission ratio in response to receiving the upshift signal, and for selecting the next lower system transmission ratio in response to receiving the downshift signal. The controller can also be configured to selectively control the first and/or second and/or third load-shifting clutch for selecting the second next, third next, fourth next, fifth next, sixth next, seventh next, eighth next higher or lower system transmission ratio in response to receiving a bail-out signal. The bail-out signal may for instance include the upshift signal and downshift signal at the same time, or within a specified time-interval.

The control unit 500 can thus be connected, e.g. wirelessly, to a first actuator 501 for actuating the first, e.g. load-shifting, clutch C1 and to a second actuator 502, e.g. wirelessly, for actuating the second, e.g. load-shifting, clutch C2. The control unit 500 can also be connected, e.g. wirelessly, to a third actuator 503 for actuating the CVT 403. The CVT 403 may be operable according to various transmission ratios. Each of the CVT transmission ratios may preprogrammed, and adapted to the transmission ratios of the first and second transmissions, 100, 200. A power supply 507 may supply power, e.g. electric power, to the control unit 500 and the actuators 501, 502, 503, sensors 506, and/or the user interface 505. The power supply may for example comprise a battery. The control unit 500 may also be arranged to operate the electric motor 450. The control unit 500 may be configured to regulate an output power or output torque of the electric motor 450. The control unit 500 may also be configured to operate a clutch for coupling and decoupling the electric motor 450 from transmission system. The electric motor 450 may be powered from a separate power source. The control unit 500 may for example include a look-up table to synchronize actuation of the one or more actuators in response to a shift signal.

Figure 14:
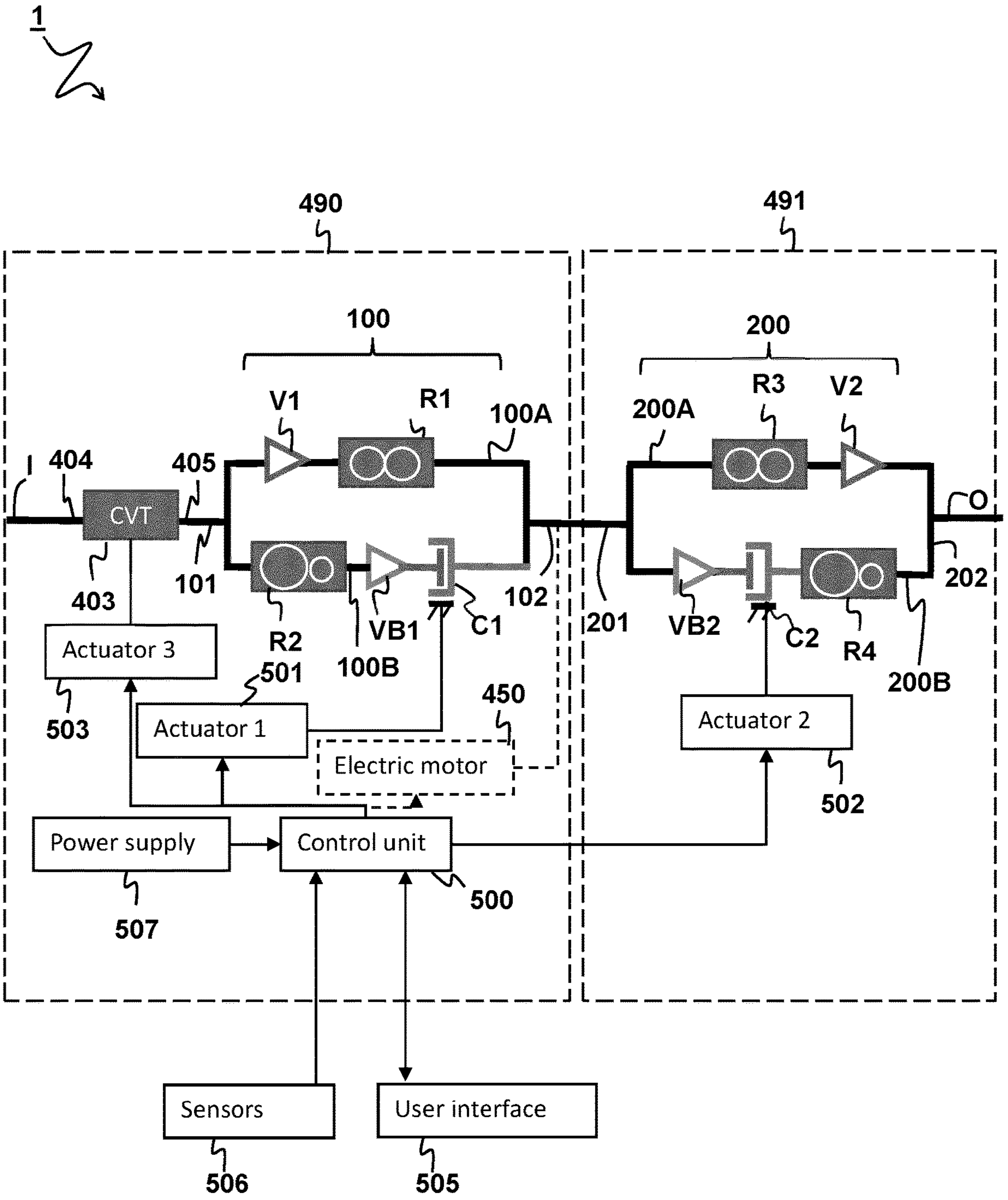
FIG. 14 shows a schematic example of a transmission system.
Figure 15:
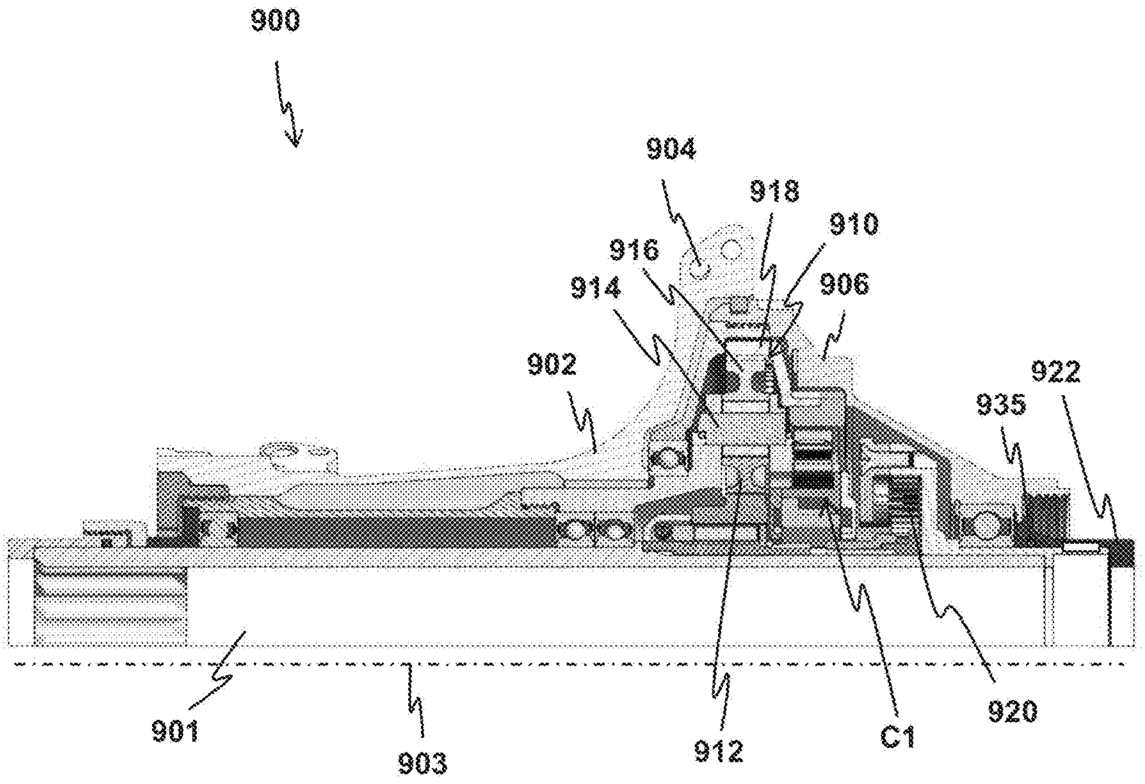
FIGS. 15-19 show a cross sectional view of a hub assembly.

FIG. 14 shows an example, similar to FIG. 13, where the CVT 403 and the first transmission 100 are included in a first housing 490, and wherein the second transmission 200 is included in a separate second housing 491. Here, the first housing 490 corresponds to a crank housing, and the CVT 403 and the second transmission 200 act as a crank transmission. Here, the second housing 491 corresponds to a hub housing, e.g. partly formed by a hub shell of a driven wheel, and the second transmission acts as a hub transmission. It will be appreciated that, alternatively, the first housing may correspond to a hub housing and the second housing to a crank housing. In this example, the first housing 490 also includes the control unit 500, the power supply 507, the electric motor 450, and the actuators 501, 503 for actuating the first transmission 100 and the CVT. The second housing 491 includes in this example the actuator 502 for actuating the second transmission 200. The actuator 502 held by the second housing 491 is connected to the control unit 500 held by the first housing 491, via a wired or wireless connection. Here, the actuator 502 is powered by the power supply 507 held by the first housing 490, wherein, in this example, the power is supplied from the power supply 507 to the actuator 502 via the control unit 500.

FIGS. 15-19 show cross-sectional views of a hub assembly 900 for a bicycle. In this example, the hub assembly is a rear wheel hub assembly. The hub assembly 900 here includes a hollow axle 901 extending along a wheel axis 903. In this example, the hollow axle 901 is arranged for non-rotatably being fixed to a frame, e.g. a bicycle frame. The hub assembly 900 includes a hub shell 902. Here the hub shell 902 is provided with apertures 904, e.g. for connection of spokes of a wheel, The hub assembly 900 further includes a driver 906. The driver 906 in this example is arranged for receiving a cassette of gear wheels (not shown). The hub shell 902 and the driver 906 form, at least partly, a hub housing of the hub assembly 900.

The hub assembly 900 can comprise various sensor and/or actuators, e.g. a speed sensor, torque sensor, brake actuator, shift actuator, etc. In this example, the hub assembly includes a transmission system, having a transmission operable between the driver 906 and the hub shell according to at least two different transmission ratios. The transmission includes, here, a planetary gear set 910, The planetary gear set 910 includes a sun gear 912, a planet carrier 914 with planet gears 916 and a ring gear 918. A clutch C1 is arranged so as to selectively couple two of the sun gear, the planet carrier and the ring gear. In this example, the clutch C1 is arranged to selectively couple the planet carrier 914 and the ring gear 918. The planet carrier 914 is also fixedly coupled to the hub shell 902. Therefore, depending on whether the planet carrier 914 and ring gear 918 are rotationally coupled, or rotationally uncoupled, driving the driver 906 causes the hub shell 902 to rotate according to a first or second transmission ratio relative to the driver 906. An overrunning clutch may be positioned between the sun gear 912 and the axle 901.

The clutch C1 can e.g. be used for selectively operating a planetary gear according to a first transmission ratio when the planet carrier 914 is engaged with the ring gear 918, and according to a second transmission ratio when the planet carrier 914 is disengaged from the ring gear 918. The clutch C1 is here electrically operable.

The hub assembly comprises an electric shift actuator. Here, an electric clutch actuator 920 for moving the clutch between a coupled state in which it couples the planet carrier 914 to the ring gear 918, and a decoupled state in which it decouples the planet carrier 914 from the ring gear 918. The electric clutch actuator 920, and/or any additional or alternative sensor and/or actuator held by the hub housing, may be communicatively connected to an external control unit, here via a wire 926. Also, the electric clutch actuator 920, and/or any additional or alternative sensor and/or actuator held by the hub housing, may be electrically powered, e.g. by an external battery, here via the wire 926, or via an additional dedicated charging wire. The wire 926 forms, at least partly, an conduction path between the clutch actuator 920 being held internal to the hub housing, and an external electric component, e.g, an external power source or control unit, being arranged external of the hub housing.

The assembly comprises an electric connection interface, including a first connection part 921 and a second connection part 922. The first and second connecting parts 921, 922 are releasably connectable to each other. Hence, the second connection part 922 may for example be physically separated from the first connection part 921. The first connection part 921 comprises a first electric contact 931, and the second connection part comprises a second electric contact 932. When the first connection part 921 and the second connection part 922 are connected to each other, the first and second contacts 931, 932 are in electrically conductive contact with each other for transmitting electric signals between the first connection part 921 and the second connection part 922. The second contact 932 is electrically connected to the wire 926. The first contact 931 is electrically connected to the clutch C1, or the actuator operating the clutch. Here, the first contact 931 and the second contact 932 are configured to provide four separate transmission channels between the first and second connection parts 921, 922, but it will be appreciated that any other number of transmission channels may also be possible. It will be appreciated that alternatively the wire 926 may be directly electrically connected to the actuator or other electronics inside the hub assembly.

FIGS. 16-19 shows close-up views of the first and second connection parts 921, 922. The first connection part 921 is here formed a bush connected to the hollow wheel axle 901. It will be appreciated that the first connection part 921 may also be integral with the axle 901. The second connection part 922 is here formed by an end cap of the hub axle. A bearing 936, here a ball bearing, is arranged between the driver 906 and the axle 901. The first connection part 921 is particularly provided between the bearing 936 and the axle 901. Hence, an electric signal path can be provided extending between the first electric contact 931 and the clutch C1, which signal path runs between the bearing 936 and the axle 901. A seal 935 is provided between the first and second connection part 921, 922.

Figure 16:
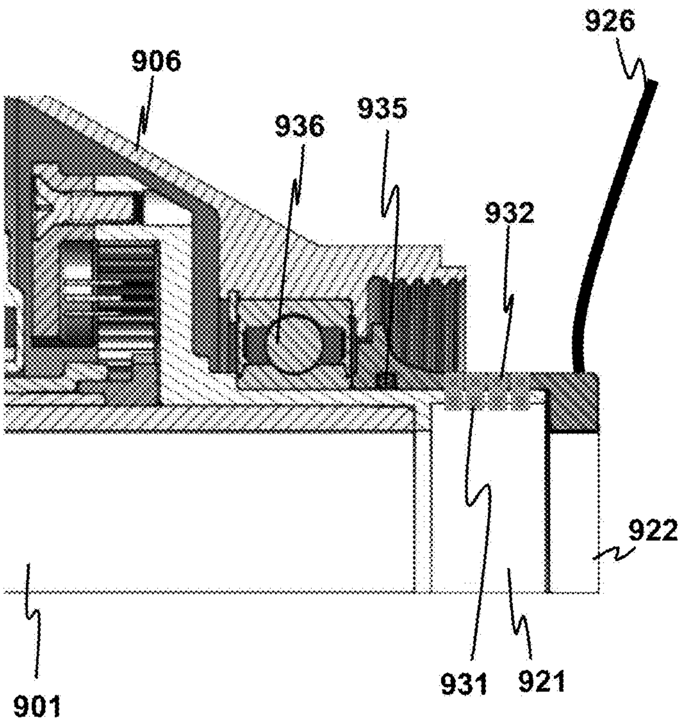

In FIG. 16, the wire 926 extends from the second connection part 922, here an end cap of the hub axle. The wire 926 is particularly fixed to the second connection part 922.

Figure 17:
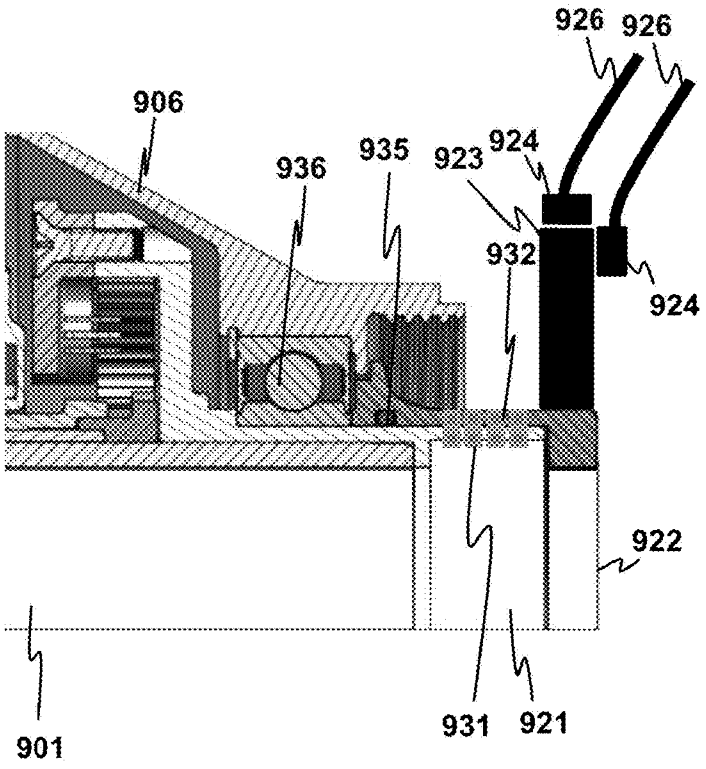

FIG. 17 shows an example wherein the second connection part 922 is provided with a socket connector 923 for releasably connecting to one or more complementary plug connectors 924. It will be appreciated that the second connection part 922 may conversely be provided with a plug connector. The plug connector 924 is wiredly connected, e.g. to an external control unit, and/or an external battery. In this example two wires 926 are releasably connectable to the second connection part 922.

Figure 18:
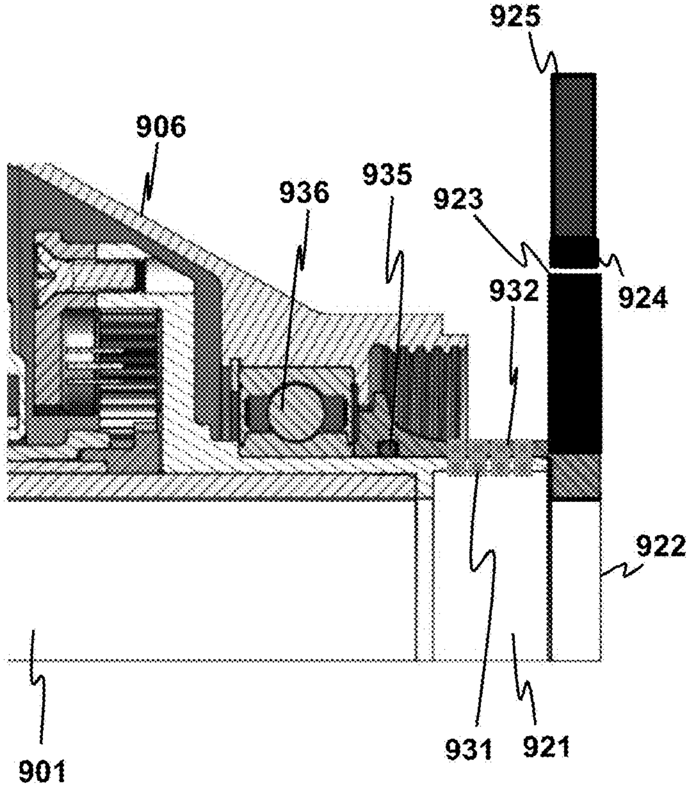

FIG. 18 shows an example wherein a wireless transceiver 925 is connectable to the second connection part 922, via the plug/socket-connection 923, 924. A wireless communication channel may hence be provided between the second connection part 922 and an external control unit.

Figure 19:
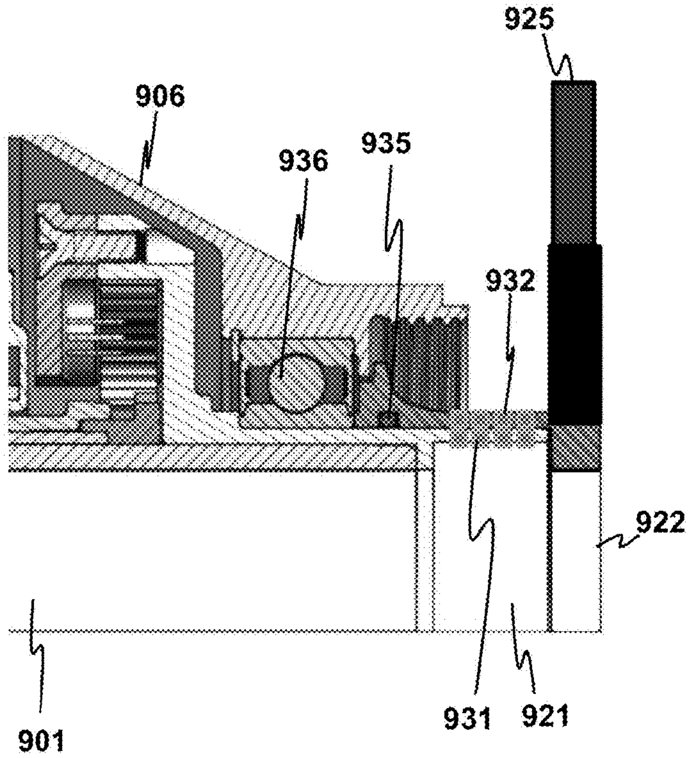

FIG. 19 shows an example wherein the wireless transceiver 925 is fixed to or integrated with the second connection part 922.

Figure 20:
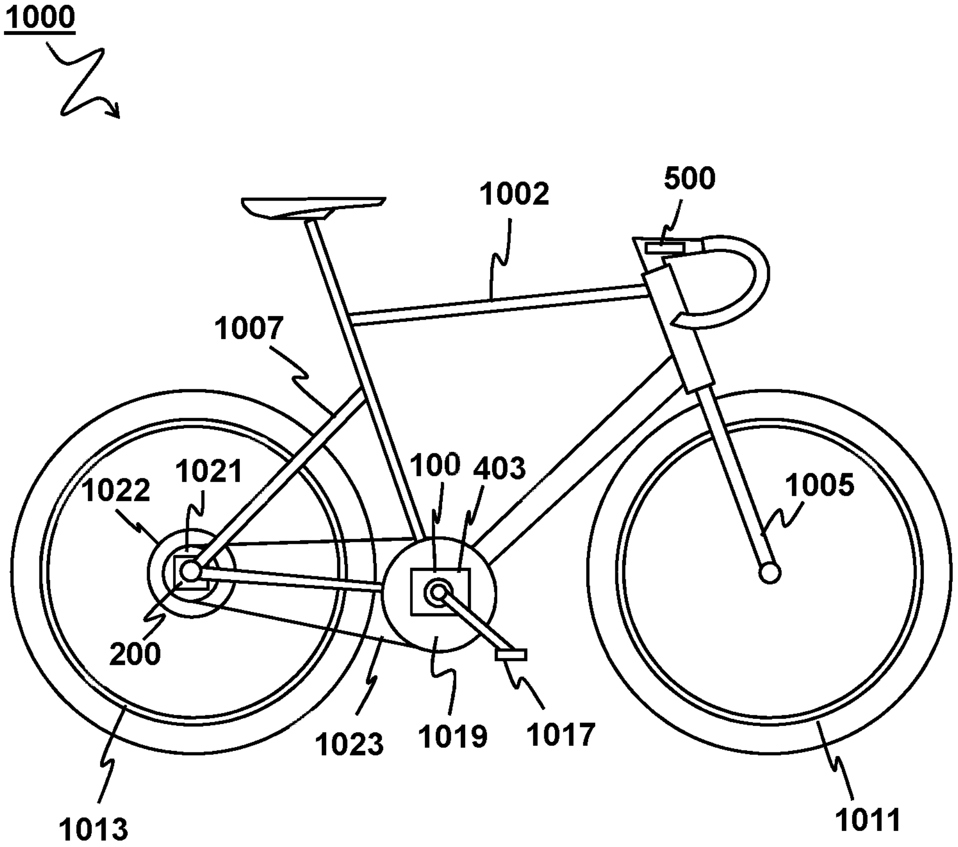
FIG. 20 shows an example of a bicycle.

FIG. 20 shows a bicycle 1000. The bicycle 1000 comprises a frame 1002 with a front fork 1005 and a rear fork 1007, as well as a front wheel and a rear wheel 1011, 1013 located in the front and rear fork respectively. The bicycle 1000 further comprises a crank 1017, and a front chain wheel 1019. In this example, the CVT 403 and the first transmission 100 are interconnected between the crank 1017 and front chain wheel 1019. The bicycle 1000 also comprises a rear sprocket 1021 and a rear wheel hub 1022 of the rear wheel 1013, wherein a chain 1023 threads over the front chain wheel 1019 and rear sprocket 1021. In this example, the second transmission 200 is interconnected between the rear sprocket 1021 and the rear wheel hub 1022. A CVT 403 may be arranged between the crank 1017 and the front chain wheel 1019, particularly between the crank 1017 and the first transmission 100. The bicycle 1000 also comprises a control unit 500, here connected to handlebars 1031. Here, the bicycle 1000 does not comprise a front and rear derailleur.

Herein, the invention is described with reference to specific examples of embodiments of the invention. It will, however, be evident that various modifications and changes may be made therein, without departing from the essence of the invention. For the purpose of clarity and a concise description features are described herein as part of the same or separate embodiments, however, alternative embodiments having combinations of all or some of the features described in these separate embodiments are also envisaged.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A transmission system for a human powered vehicle, comprising:

a system input and a system output, wherein the system input is arranged to be connected to a power source, and the system output is arranged to be connected to a load, a continuously variable transmission (CVT) and a first transmission between the system input and the system output, and a control unit configured to control the CVT and the first transmission;

the control unit being configured to control the CVT to selectively operate according to one of two or more distinct transmission ratios within a continuous range of transmission ratios, and the CVT having an actuation element for switching the CVT from one transmission ratio to another; and the control unit being configured to control the first transmission to selectively operate according to a first transmission ratio or a second transmission ratio;

wherein the CVT and the first transmission are connected in series, such that the transmission system is operable according to a plurality of different system transmission ratios determined by the selected transmission ratio of the CVT and the selected transmission ratio of the first transmission, and wherein the transmission ratios of a predetermined finite set of different transmission ratios of the CVT are selected such that the transmission system provides substantially constant transmission ratio step sizes between respective system transmission ratios, or such that the transmission system includes progressively increasing and/or decreasing transmission ratio step sizes between respective system transmission ratios.

2. The transmission system of claim 1, wherein the first transmission has a first clutch for switching the first transmission from the first transmission ratio to the second transmission ratio and/or vice versa.

3. The transmission system of claim 1, wherein the first transmission includes a first transmission path for providing the first transmission ratio and a second transmission path, parallel to the first transmission path, for providing the second transmission ratio, at least one of the first and second transmission paths including a first clutch.

4. The transmission system of claim 3, wherein at least one of the first transmission path and the second transmission path includes a respective planetary gear set.

5. The transmission system of claim 1, wherein the CVT comprises:

a first drive element that is rotatable about a first axis, a second drive element that is rotatable about a second axis parallel to the first axis, wherein the second drive element is movable relative to the first drive element in a direction transverse to the first axis; and first coupling elements for transferring torque between the first drive element and the second drive element, wherein the first coupling elements are provided at a constant first radius from the first axis and at a variable second radius from the second axis.

6. The transmission system of claim 5, wherein the CVT comprises a third drive element that is rotatable about a third axis parallel to the second axis wherein the third drive element and the second drive element are movable relative to each other in a direction transverse to the third axis; and second coupling elements provided at a constant third radius from the third axis and at a variable fourth radius from the second axis, for transferring torque between the third drive element and the second drive element.

7. The transmission system of claim 1, comprising a second transmission between the system input and the system output, the second transmission being selectively operable according to a third transmission ratio or a fourth transmission ratio, wherein the CVT, the first transmission, and the second transmission are connected in series, such that the transmission system is operable according to a plurality of different system transmission ratios determined by the selected transmission ratio of the CVT, the selected transmission ratio of the first transmission, and the selected transmission ratio of the second transmission.

8. The transmission system of claim 7, wherein the second transmission includes a third transmission path for providing the third transmission ratio and a fourth transmission path, parallel to the third transmission path, for providing the fourth transmission ratio, at least one of the third and fourth transmission paths including a second clutch for switching the second transmission from the third transmission ratio to the fourth transmission ratio and/or vice versa.

9. The transmission system of claim 7, wherein at least one of the first transmission ratio and the second transmission ratio is a speed-down transmission ratio, and at least one of the third transmission ratio and the fourth transmission ratio is a speed-up transmission ratio.

10. The transmission system of claim 7, wherein the first, second, third and fourth transmission ratios of the first and second transmissions determine a range of system transmission ratios, and the transmission ratios of the CVT provide intermediate system transmission ratios between system transmission ratios determined by the first and second transmission.

11. The transmission system of claim 7, wherein the CVT is configured to extend the range of system transmission ratios provided by the first and second transmissions.

12. The transmission system of claim 7, wherein the CVT provides intermediate transmission ratio steps, between the system transmission ratios obtainable with only the first and second transmissions.

13. The transmission system of claim 7, wherein the CVT extends the range of system transmission ratios provided by the first and second transmissions.

14. The transmission system of claim 1, comprising an electric motor, for propelling, or assist propelling, of the vehicle, wherein the electric motor is connected between the CVT and the first transmission.

15. The transmission system of claim 14, wherein the CVT and the electric motor housed in a crank housing.

16. The transmission system of claim 1, wherein the CVT and the first transmission are housed in a common housing.

17. A distributed transmission system for a bicycle, comprising a crank assembly for being arranged at a crank of a bicycle, and a wheel hub assembly for being arranged at a wheel of the bicycle, wherein one of the crank assembly and the wheel hub assembly comprises the transmission system of claim 1, and another one of the crank assembly and the hub assembly comprises a further transmission being selectively operable according to at least two different transmission ratios, and having a further clutch for switching the further transmission between its different transmission ratios.

18. The distributed transmission system of claim 17, comprising a single control unit connected to the crank assembly for controlling a shift actuator of the transmission system, and further connected to the hub assembly for controlling a further shift actuator of the further transmission.

19. A wheel hub assembly for the distributed transmission system of claim 17, comprising a hub housing holding one or more sensors and/or actuators, and an electric connection interface for electrically connecting the one or more sensors and/or actuators with an externally arranged electric component, an external power source, external control unit and/or external user-operable shifter, the electric connection interface being arranged for transmitting electric power and/or electronic communication signals between the external electric component and one or more sensors and/or actuators.

20. The wheel hub assembly of claim 19, wherein the connection interface comprises a first connection part having a first electric contact being electrically connected to the one or more sensors and/or actuators; and a second connection part, being releasable connectable to the first connection part, and having a second electric contact arranged for being electrically connected to an external electric component, such as to an external power source and/or external control unit, wherein the first and second electric contacts are arranged for being in contact with one another so as to conduct electric signals therebetween when the first and second connection parts are mechanically coupled to each other.

21. The wheel hub assembly of claim 20, wherein the second contact is configured for being electrically connected to rear derailleur electronics.

22. A crank assembly for a bicycle for the distributed transmission system of claim 17, comprising a crank housing holding one or more sensors and/or actuators, and an electric connection interface for electrically connecting the one or more sensors and/or actuators with an externally arranged electric component, an external power source, external control unit and/or external user-operable shifter, the electric connection interface being arranged for transmitting electric power and/or electronic communication signals between the external electric component and one or more sensors and/or actuators.

23. The transmission system of claim 1, wherein the first transmission ratio and second transmission ratio of the first transmission determine a range of system transmission ratios, and the transmission ratios of the CVT provide intermediate system transmission ratios between the first transmission ratio and second transmission ratio of the first transmission.

24. The transmission system of claim 1, wherein the control unit is configured to control the CVT to selectively operate according to a predetermined finite set of different transmission ratios within the continuous range of transmission ratios.

25. The transmission system of claim 1, wherein the CVT is configured to be operable according to a predetermined finite set of transmission ratios within the continuous range of CVT transmission ratios.

26. The transmission system of claim 1, wherein the transmission ratios for operation of the CVT are preprogrammed, and the CVT is configured to be controlled to switch from one preprogrammed transmission ratio to another.

27. The transmission system according to claim 1, wherein the CVT is controlled to operate at a first CVT transmission ratio and a second CVT transmission ratio, wherein a ratio of the second CVT transmission ratio and the first CVT transmission ratio is approximately half of the ratio of the second transmission ratio and the first transmission ratio of the first transmission; or wherein the CVT is controlled to operate at a first CVT transmission ratio, a second CVT transmission ratio and a third CVT transmission ratio, wherein a ratio of the second CVT transmission ratio and the first CVT transmission ratio is approximately one third of the ratio of the second transmission ratio and the first transmission ratio, and a ratio of the third CVT transmission ratio and the first CVT transmission ratio is approximately two thirds of the ratio of the second transmission ratio and the first transmission ratio.

28. A transmission system for a human powered vehicle, comprising:

a system input and a system output, wherein the system input is arranged to be connected to a power source, and the system output is arranged to be connected to a load, a continuously variable transmission (CVT) and a first transmission between the system input and the system output, and a control unit configured to control the CVT and the first transmission;

the control unit being configured to control the CVT to selectively operate according to one of two or more distinct transmission ratios within a continuous range of transmission ratios, and the CVT having an actuation element for switching the CVT from one transmission ratio to another; and the control unit being configured to control the first transmission to selectively operate according to a first transmission ratio or a second transmission ratio;

wherein the CVT and the first transmission are connected in series, such that the transmission system is operable according to a plurality of different system transmission ratios determined by the selected transmission ratio of the CVT and the selected transmission ratio of the first transmission, and wherein the transmission ratios for operation of the CVT are chosen such that the system transmission ratios have a substantially constant transmission step size between respective system transmission ratios.

29. A transmission system for a human powered vehicle, comprising:

a system input and a system output, wherein the system input is arranged to be connected to a power source, and the system output is arranged to be connected to a load, a continuously variable transmission (CVT) and a first transmission between the system input and the system output, and a control unit configured to control the CVT and the first transmission;

the control unit being configured to control the CVT to selectively operate according to one of two or more distinct transmission ratios within a continuous range of transmission ratios, and the CVT having an actuation element for switching the CVT from one transmission ratio to another; and the control unit being configured to control the first transmission to selectively operate according to a first transmission ratio or a second transmission ratio;

wherein the CVT and the first transmission are connected in series, such that the transmission system is operable according to a plurality of different system transmission ratios determined by the selected transmission ratio of the CVT and the selected transmission ratio of the first transmission, and wherein the transmission ratios for operation of the CVT are chosen such that the system transmission ratios include a nonlinear set of system transmission ratios.

* * * * *